United States Patent
Sheiretov et al.

(10) Patent No.: US 8,415,947 B2
(45) Date of Patent: Apr. 9, 2013

(54) METHOD FOR STRESS ASSESSMENT THAT REMOVES TEMPERATURE EFFECTS AND HYSTERESIS ON THE MATERIAL PROPERTY MEASUREMENTS

(75) Inventors: Yanko K. Sheiretov, Waltham, MA (US); Neil J. Goldfine, Newton, MA (US); Todd M. Dunford, Waltham, MA (US); Scott A. Denenberg, Somerville, MA (US); David C. Grundy, Reading, MA (US); Darrell E. Schlicker, Freeland, MI (US); Andrew P. Washabaugh, Chula Vista, CA (US); Karen E. Walrath, Arlington, MA (US)

(73) Assignee: Jentek Sensors, Inc., Waltham, MA (US)

( * ) Notice: Subject to any disclaimer, the term of this patent is extended or adjusted under 35 U.S.C. 154(b) by 0 days.

(21) Appl. No.: 13/549,875

(22) Filed: Jul. 16, 2012

(65) Prior Publication Data

US 2013/0014589 A1 Jan. 17, 2013

Related U.S. Application Data

(62) Division of application No. 12/157,719, filed on Jun. 12, 2008, now Pat. No. 8,222, 897.

(60) Provisional application No. 60/934,191, filed on Jun. 12, 2007, provisional application No. 60/999,126, filed on Oct. 16, 2007, provisional application No. 61/070,654, filed on Mar. 25, 2008, provisional application No. 61/125,860, filed on Apr. 29, 2008.

(51) Int. Cl.
*G01R 33/12* (2006.01)
*G01N 27/72* (2006.01)
*G01N 27/90* (2006.01)
*G01B 7/24* (2006.01)

(52) U.S. Cl.
USPC ........... 324/242; 324/225; 324/232; 324/209; 324/243; 324/202

(58) Field of Classification Search ............... 324/209, 324/225, 227–243, 202
See application file for complete search history.

(56) References Cited

U.S. PATENT DOCUMENTS

| 5,015,951 A | 5/1991 | Melcher |
| 5,293,119 A | 3/1994 | Podney |

(Continued)

FOREIGN PATENT DOCUMENTS

EP 1 600 769 A1 11/2005

OTHER PUBLICATIONS

Partial International Search Report for PCT/US2008/007326 filed Jun. 12, 2008.

(Continued)

*Primary Examiner* — Jay Patidar
(74) *Attorney, Agent, or Firm* — Hamilton, Brook, Smith & Reynolds, P.C.

(57) ABSTRACT

An apparatus for the nondestructive measurement of materials that includes at least two layers of electrical conductors. Within each layer, a meandering primary winding is used to create a magnetic field for interrogating a test material while sense elements or conducting loops within each meander provide a directional measurement of the test material condition. In successive layers extended portions of the meanders are rotated so that the sense elements provide material condition in different orientations without requiring movement of the test circuit or apparatus. Multidirectional permeability measurements are used to assess the stress or torque on a component. These measurements are combined in a manner that removes temperature effects and hysteresis on the property measurements. This can be accomplished through a correction factor that accounts for the temperature dependence.

9 Claims, 20 Drawing Sheets

U.S. PATENT DOCUMENTS

| | | |
|---|---|---|
| 5,793,206 A | 8/1998 | Goldfine et al. |
| 6,657,429 B1 | 12/2003 | Goldfine et al. |
| 8,222,897 B2 | 7/2012 | Sheiretov et al. |
| 2003/0080744 A1 | 5/2003 | Goldfine et al. |
| 2004/0004475 A1 | 1/2004 | Goldfine et al. |
| 2005/0083032 A1* | 4/2005 | Goldfine et al. ............. 324/71.1 |
| 2005/0171703 A1 | 8/2005 | Goldfine et al. |
| 2007/0114993 A1 | 5/2007 | Goldfine et al. |

OTHER PUBLICATIONS

Zilberstein, V. et al., "Early Detection and Monitoring of Fatigue in High Strength Steels with MWM-Arrays," *Int. J. Fatigue*, 27: 1644-1652 (2005).

* cited by examiner

METHOD FOR STRESS ASSESSMENT THAT REMOVES TEMPERATURE EFFECTS AND HYSTERESIS ON THE MATERIAL PROPERTY MEASUREMENTS

RELATED APPLICATIONS

This application is a divisional of U.S. application Ser. No. 12/157,719, filed Jun. 12, 2008, now U.S. Pat. No. 8,222,897, which claims the benefit of U.S. Provisional Application Nos. 60/934,191 filed Jun. 12, 2007, 60/999,126 filed Oct. 16, 2007, 61/070,654 filed Mar. 25, 2008, and 61/125,860 filed Apr. 29, 2008.

The entire teachings of the above applications are incorporated herein by reference.

GOVERNMENT SUPPORT

The invention was supported, in whole or in part, under contract W911W6-08-C-0006, from the U.S. Army. The Government has certain rights in the invention.

BACKGROUND OF THE INVENTION

The technical field of this invention is that of nondestructive evaluation for material characterization, which includes quantitative, model-based assessment of surface, near-surface, and bulk material condition for flat and curved parts or components. Characterization of bulk material condition includes measurement of changes in material state such as degradation or damage, assessment of residual stresses and applied loads, and assessment of processing-related conditions, for example, from shot peening, roll burnishing, or heat treatment. It also includes measurements characterizing the material, such as alloy type, and material states, such as porosity and temperature. Characterization of surface and near-surface conditions includes measurements of surface roughness, changes in relative position, coating thickness, and coating condition. Each of these includes detection of variations in electromagnetic sensor responses associated with the presence of flaw conditions or microstructural, compositional, or magnetic structure (e.g., domain orientation) changes.

A particular aspect of this invention is related to sensing and monitoring mechanical stress, strain, and load on a material. Stress and load monitoring are important for developing health usage and monitoring systems for vehicles such as rotorcraft. These systems require technologies such as direct load monitoring, on-board damage monitoring and advanced diagnostics for early fault detection to meet the demand for increased safety and reduced operational cost. For example, early detection of damage and cracks in air vehicle structures supports a more effective damage tolerance approach and supplements mechanical diagnostics and usage monitoring. In particular, on-board damage monitoring can provide timely detection of mechanical damages that remain undetectable by conventional methods until the next scheduled inspection, which can enhance safety, improve readiness and mission performance, and reduce maintenance costs. The fields of strain sensing, using strain gages, and load monitoring are relatively mature with numerous approaches that enable monitoring of stresses, strains and loads. These include conventional strain gages, optical fiber strain gages, and ultrasonic methods.

Magnetic field or eddy current sensors have also been used to assess stress on a material. Conventional eddy-current sensing involves the excitation of a conducting winding, the primary, with an electric current source of prescribed frequency. This produces a time-varying magnetic field, which in turn is detected with a sensing winding, the secondary. The spatial distribution of the magnetic field and the field measured by the secondary is influenced by the proximity, physical properties (electrical conductivity and magnetic permeability), and geometry (layer thickness) of nearby materials. When the sensor is intentionally placed in close proximity to a test material, the physical properties of the material can be deduced from measurements of the impedance between the primary and secondary windings. As an example, Goldfine et al. have disclosed methods under U.S. Pat. Nos. 5,015,951, RE36,986, 5,453,689, 5,793,206, 6,188,218, 6,252,398, 6,377,039, and 6,657,429 that describe magnetic field sensors that operate in the magnetoquasistatic regime (in other words, the wavelength of traveling waves is long compared to the sensor dimensions). These sensors use precomputed databases of sensor response to estimate the lift-off (sensor proximity) and directional magnetic permeability, directional electrical conductivity, and layer thicknesses for uniform, layered and modified-surface materials. As another example, U.S. Pat. No. 5,828,211 to Scruby et al. describes measuring a response of a directional magnetic field sensor as the sensor is rotated over a test material and using this information to determine the biaxial stress distribution.

SUMMARY OF THE INVENTION

Aspects of the methods described herein involve test circuits for the nondestructive evaluation of electrical properties of materials and the use of these properties to assess material conditions of interest, such as load related parameters, or stress in vehicular drive trains and similar mechanisms, such as those used in rotorcraft.

In one embodiment, a test circuit has at least two layers of primary winding electrical conductors to impose a magnetic field or flux in a test material when driven by an electric current. These conductors follow a meandering path and have segments with linear parallel extended portions and cross-connections at the ends of the segments. The extended portions in each layer are positioned at an angle with respect to the extended portions in each other layer. In addition, the test circuit has at least one sense element associated with each primary winding, where the sense element has conducting segments aligned with the extended portions of the primary winding to link magnetic flux from the primary winding. Each sense element also has a feature, such as a length or position with respect to each non-associated primary winding, which can be selected to minimize the flux from the non-associated primary winding. This allows each sense element to be sensitive only to the properties of the test material in a direction corresponding to the associated primary winding and this allows the test circuit to monitor multiple material property directions without having to move the test circuit with respect to the test material.

The sense elements can be configured in a variety of ways. In one embodiment, the sense element feature used to minimize the flux from non-associated primary windings is the position of the center of the sense element, and the sense element is centered over a conducting segment of a non-associated primary winding. In another embodiment, the feature is sense element length, and the length is an integral multiple of twice the distance between extended portions of a non-associated primary winding divided by the sine of the angle between extended portions of the non-associated and associated windings. In another embodiment, the sense elements are centered between the extended portions of the associated primary winding. The sense elements may be in the same layer or a different layer as the associated primary winding.

The term "direction" in this document means a set of parallel lines in a two-dimensional plane (the surface of the material). One such set will be chosen as the 0° direction, and other sets (directions) will be identified by the angle between lines in those sets and lines in the 0° direction. Since there is no polarity to the direction (these are lines, not rays), directions whose angles differ by 180° are the same, e.g., the −45° direction is the same as the 135° direction, −60° is the same as 120°, etc.

For measurements in two directions, the angle between extended portions of the primary windings in two different layers is 90°. Furthermore, when this pair of primary windings is driven in series, the net dipole moment for the combination is zero. In another embodiment, the test circuit permits measurements in four directions. In a particular embodiment, the relative directions between the extended portions are 0°, 45°, 90°, and −45° (135°). The test circuit can be operated as four individual primary windings, or two pairs of primary windings, which may also be connected in series. Inter-layer connections between the ends of the segments of the primary windings in some layers may also be present.

This directional test circuit can be used to assess directional properties and condition of a test material. In one embodiment, the test circuit is used to obtain a stress-dependent property in each direction, a stress-independent property, and another feature of interest, such as the sensor proximity to the test material surface. The test circuit allows electrical properties of the material to be measured at multiple orientations without having to move the sensor. In an application, such as a measurement of a magnetizable steel component, the magnetic permeability, electrical conductivity, and lift-off (distance between sensor and component) are measured for each sense element orientation. This then allows load-related parameters to be determined in each orientation, such as torque, bending load, axial load, temperature, vibration, or rotational speed. Since the measurements are performed with the same nominal lift-off between the test circuit and the surface of the material being examined, and the distances between layers in the stacked construct are known, the measurement of the lift-off with each sense element orientation provides redundancy and the capability for measurement consistency validation. Alternatively, the independent information provided by the multiple sensing elements can be used to increase the number of unknowns that can be estimated independently. For example, for a four-direction sensor, it is possible to measure the stress-dependent magnetic permeability in each direction, while the electrical conductivity is stress-independent. The measurements of the electrical conductivity can be used to correct for variations in environmental factors such as temperature.

In an embodiment, the stress or load on a test material is assessed by placing a sensor proximate to the test material with the sensor providing drive windings and sense elements that permit measurements of a magnetic permeability, in at least two different directions. The sense elements predominantly couple to one of the drive windings and not to the others and permit monitoring of an overlapping area between the various drive windings and sense elements. The magnetic permeability obtained with each sense element typically exhibits hysteresis as the applied load is varied, but correction and compensation for this hysteresis in a specific or first direction can be accomplished by using the magnetic permeability information from a second direction. In particular, by loading the test material to a known level, a correction factor can be computed that will remove the hysteresis from the magnetic permeability measured for the first direction, which in turn can be correlated with the stress in the first direction. While not required, it is often convenient to measure the responses from each sense element simultaneously.

In a specific embodiment, the test material is a rotating cylinder or shaft, the sensor has two pairs of orthogonal drive winding and sense elements, and the sensor is located in a stationary position, not in contact with the cylinder. This then allows for a non-contact measurement of the stress on the rotating cylinder. Example measured loads are the torque, axial load, and bending loads on the cylinder. In addition, the cylinder can be a spinning shaft as part of a drive system and the cylinder may be a ferrous metal element such as a magnetizable steel.

Another embodiment describes an approach that generates a linear relationship between a measured magnetic property, such as magnetic permeability, and a material stress. This requires correcting for hysteresis and temperature dependent material property variations, but has distinct advantages in control system applications where a linear response is often required for efficient system operation. The linear response is obtained by disposing at least two magnetic sensors near a test material surface with each sensor providing a directional measurement of a magnetic property as a load applied to the test material is varied. The uncorrected magnetic property in a first direction or a direction of interest typically varies nonlinearly with stress and exhibits hysteresis. Combining this response with a correction factor results in a corrected magnetic property value, this exhibits substantially less hysteresis and a linear variation with stress. The correction factor is determined by comparing the magnetic property values in the first and additional directions for at least two known levels of applied loads. In particular, the correction factor can use the magnetic property in a direction experiencing a known applied load to normalize the magnetic property value in the first direction to remove the effect of temperature.

In specific embodiments, the corrected magnetic property values are used as inputs to a control algorithm, for adjustment of loads during assembly operations, to monitor a process on a material, or for coating a substrate with another material layer. The approach can also be used for heterogeneous materials, such as composite structures, where the corrected magnetic property represents the real part of a diamagnetic complex permeability representation for the test material.

In yet another embodiment, composite materials can be assessed using these methods to provide, for example, applied load or temperature. Many composites contain a woven fiber or fabric material embedded within a matrix material. The condition of the composite, such as a graphite fiber/epoxy composite, can be determined from magnetic sensor measurements of the composite response. In particular, for a directional magnetic sensor geometry, the drive windings and sense elements of the sensor can be aligned with the fibers inside the composite to enhance the sensitivity of the measurement. Furthermore, with sensors that provide directional sensitivity in at least two directions, the orientation angle between the fields generated by the distinct drive windings can be selected to match the angles of between the fiber directions in the composite. If necessary, the bulk properties of the composite can be modeled as a complex diamagnetic permeability and the components of the complex permeability, such as the real and imaginary parts or equivalently the magnitude and phase, can be related to composite condition.

Another aspect of this invention is that the relative motion between the sensor and the test material can influence the sensor response. To assess the stress on a rotating cylinder, since the depth of penetration of the sensing magnetic field and sensor response can change with the rotation rate of the cylinder, the sensor is operated with an excitation frequency above a predetermined level where depth of penetration does not vary significantly with rotation rate. In addition, the sensor is calibrated by combining at least two load conditions and two different lift-offs or sensor proximities during the initial installation of the sensors. During operation a response is measured for each sense element and used to estimate the stress on the cylinder. This typically involves a correction for temperature variations in the sensor response. For example, the temperature correction can be accomplished by estimating the stress in a direction with approximately constant loading and determining a correction factor that can be applied to the data in other directions where the loading is not constant. Alternatively, using databases of precomputed responses permits independent estimation of the conductivity and permeability of the test material. The conductivity response can be used to assess the temperature variations and used to correct the measured magnetic permeability, which in turn is correlated with the stress. The stress estimation signal-to-noise ratio can also be improved by using spatially sequence averaging where data obtained over multiple cylinder rotations is averaged based on the rotation position. The signal integrity can be further enhanced by using responses from sensors placed at different circumferential positions. A coating may be added to the cylinder to enhance sensitivity to the stress measurement. The sensor can also be attached to the cylinder with electrical connections to the sensor leads made through slip rings.

BRIEF DESCRIPTION OF THE DRAWINGS

The foregoing and other objects, features and advantages of the invention will be apparent from the following more particular description of preferred embodiments of the invention, as illustrated in the accompanying drawings. In the drawings like reference characters refer to the same parts throughout the different views. The drawings are not necessarily to scale, emphasis instead being placed upon illustrating the principles of the invention.

FIGS. 6 and 6A shows a schematic drawing for a full three-dimensional stress state;

DETAILED DESCRIPTION OF THE INVENTION

A description of preferred embodiments of the invention follows.

This invention addresses the need for apparatus and methods for improved nondestructive assessment of material condition, particularly in situations where the material condition is anisotropic, i.e., it depends upon direction. Representative applications include measurements of residual stress, axial load, bending load, and torque. This is accomplished using sensor or test circuit constructs that use magnetic fields to interrogate a test material and do not require rotation of the construct to provide directional property information. The sensors are mounted near or onto a test material surface and are operated in the quasistatic frequency regime. In particular, sensor or test circuit constructs are described which allow the material condition to be determined through electrical property measurements at multiple orientations without having to move the sensor.

Figure 1:
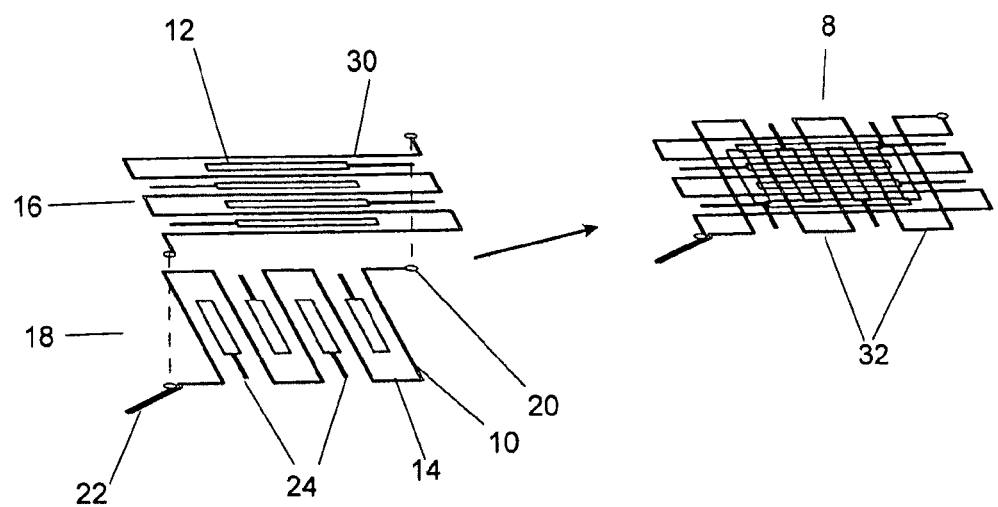
FIG. 1 shows an expanded view drawing of a bidirectional MWM having primary windings in two layers.
Figure 2:
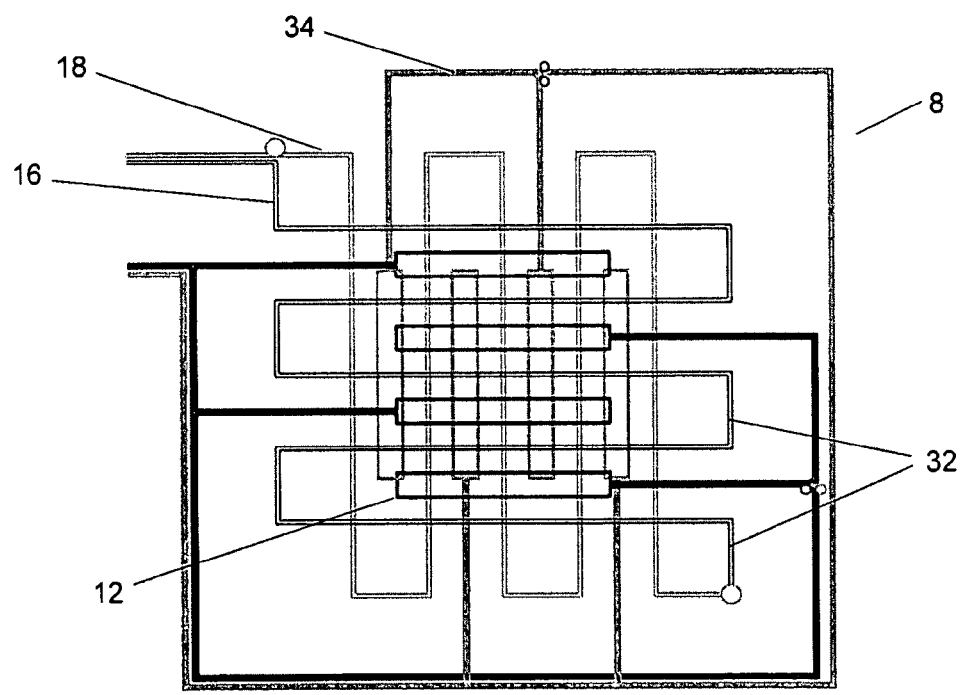
FIG. 2 shows a top view drawing of a bidirectional MWM having primary windings in two layers.

FIG. 1 shows an expanded view of a bidirectional meandering winding magnetometer (MWM®) sensor. This sensor geometry is based upon directional MWM, which is planar, conformable eddy-current sensor that was designed to support quantitative and autonomous data interpretation methods and is described, for example, in U.S. Pat. Nos. 5,453,689, 5,793,206, 6,188,218, and 6,657,429. In this case, the sensor has two layers (16 and 18) of conducting segments. Each layer has a primary winding 14 having meandering conducting segments and extended portions 10 for creating a magnetic field. Each layer also has sense elements or secondary windings 12 parallel to and centered between adjacent extended portions of the primary winding for sensing the response. In this case an inter-layer conductor or via 20 at the end of the segments for each layer allows current to flow between the primary winding conducting segments in pairs of layers. If separate connections are made to the primary windings in each layer, then vias are not required, and each layer can be excited individually. The primary winding is fabricated in a spatially periodic pattern with the dimension of the spatial periodicity termed the spatial wavelength λ. The layers are then stacked to create the relatively thin and flexible sensor construct 8 shown in FIG. 1 and FIG. 2. Each sensing element has separate connection leads 24, which allows each sense element to have a separate output connection; alternatively, a common output connection can be used for the sense elements associated with the same primary winding, typically in a single layer, by appropriately cross-connecting the connection leads 34 in series.

A current is applied to the primary winding 14 to create a magnetic field and the response of the test material to the magnetic field is measured through the voltage at the terminals of the secondary windings. This voltage reflects the condition of the test material and is dependent upon the orientation of the sensor, such as the extended portions of the drive winding, with respect to any directional property variations in the test material. This sensor is capable of independent directional measurement of permeability, conductivity, or other properties. This makes it useful, for example, in applications that require measurement of stress (residual or applied), including the various stresses experienced by a shaft under torsional, bending, and axial loads. With the extended portions in one layer (10) rotated or an angle with respect to the orientation of the extended portions in another layer (30), the sensor can respond to material property variations in two directions without having to move or rotate the sensor against the test material surface. Each sense element provides an independent measurement of the lift-off, which is the proximity between the sensor and the surface of the material being examined. Since the measurements are performed with the same nominal lift-off, accounting for the distances between the stacked layers, this redundancy permits the consistency of the measurement to be verified or validated. For example, when using a measurement grid as described below, each of the data points, which correspond to data from sensing elements in different layers, should map out a lift-off line when examining a material with uniform properties. Alternatively, the simultaneous measurement of each sense element at same location provides independent information that allows more unknowns to be determined; since the difference in lift-off between sensing elements is known, the measurement information from different sense elements can be used to determine an electrical or geometric property of the test material instead of using that information to determine the lift-off for each individual sense element.

The sensor in FIG. 1 has orthogonal primary windings 14 and permits measurements at 0° and 90°. The primary windings are designed so that the short side element 32 of the primary in each layer partially completes an additional period of the primary winding in the other layer. In this sense the primary windings in these layers are paired and when driven in series the fields from the primary windings are complementary. In this layout, the primary winding pair has no net dipole moment, which eliminates the need for double-loop primary layouts described, for example, in U.S. Pat. No. 6,657,429. The secondary elements are insensitive to the magnetic fields of the perpendicular-orientation windings because the net magnetic flux that they link cancels out to zero, which, in this embodiment, is due to the secondary elements being positioned symmetrically across a long segment of the non-associated primary winding, as discussed in more detail below. This flux cancellation will only happen if the material under test is uniform across the sensor footprint; the secondary elements will have some sensitivity to property gradients in the perpendicular orientation.

An important feature of this directional sensor design is the sense elements are configured to be sensitive to one associated set of primary winding conductors or the associated primary winding of a single layer. Features of the sense element, such as the sense element position and size, are adjusted to minimize and ideally eliminate the magnetic flux from the non-associated primary windings in other layers so that the sense elements are insensitive to the flux linked from these other primary windings. One mechanism for minimizing this flux is to make the center point of the sense element loop lie over the long segment of a non-associated primary winding. This symmetry allows the flux to be cancelled for any sense element length and orientation angle. A second mechanism for minimizing the flux from non-associated primary windings is to choose the length of the sense element appropriately. A secondary element will be insensitive to a primary winding that is at angle α with respect to the sensing element, as long as the sense element length is an integral multiple of l=λ/sin(α), where λ is the spatial wavelength of the primary winding (defined as twice the distance between adjacent long segments), since this length (l) is the periodicity of the magnetic field generated by the primary at the angle of the secondary. Any sensor configuration with two or more primaries where the sense elements are laid out so as to be insensitive to the magnetic fields generated by all non-associated primary winding, using either of these two mechanisms, will constitute a multi-directional sensor.

Figure 3:
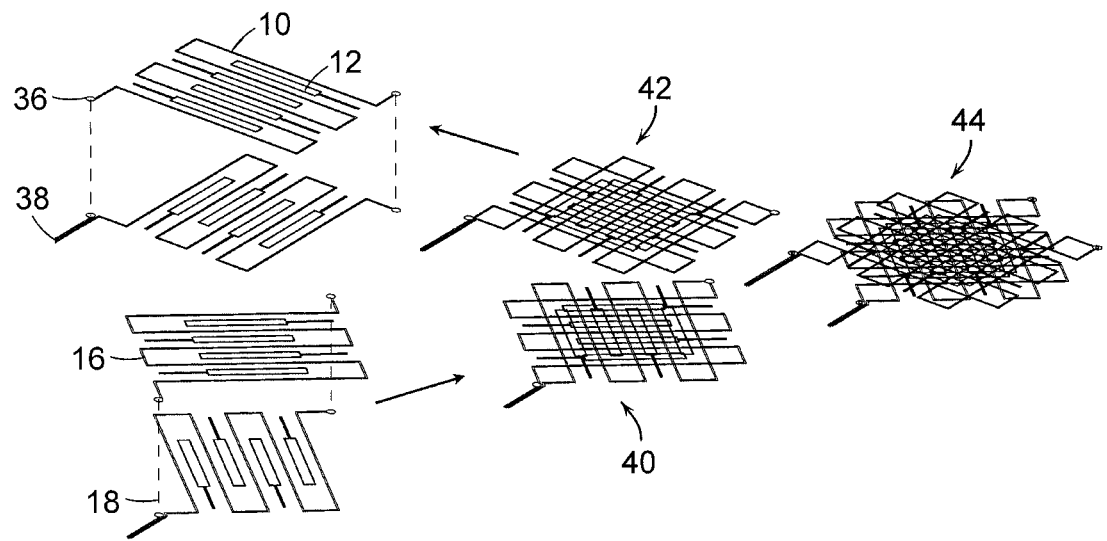
FIG. 3 shows an expanded view drawing of a quadridirectional MWM having primary windings in four layers.
Figure 4:
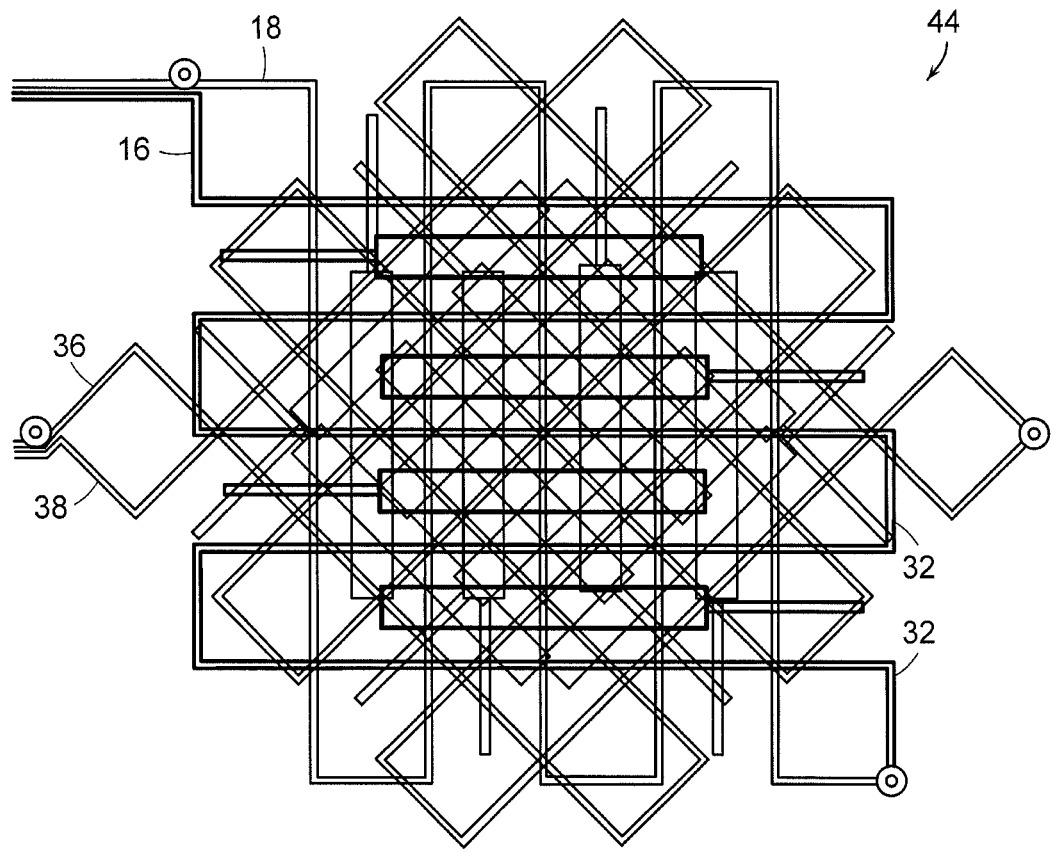
FIG. 4 shows a top view drawing of a quadridirectional MWM having primary windings in four layers.

FIG. 3 shows the layout of a quadridirectional MWM sensor capable of simultaneous independent measurement in four directions. For stress measurements, this sensor is also referred to as a quadridirectional magnetic stress gage (QD-MSG). These directions are designated by 0°, 90°, −45°, and 45° which are chosen to align with the directions that the magnetic permeability would be measured for a magnetizable material. In this example construct, two pairs of complementary layers are combined to form two bidirectional sensors (40 and 42) which are then stacked to form the quadridirectional sensor 44. The extended portions between each pair are rotated, in this case by 45°, in order to provide additional directional sensitivity. The traces or conducting segments for each pair are fabricated onto different layers, for example layers 36 and 38 correspond to bidirectional sensor 42 while layers 16 and 18 correspond to bidirectional sensor 40. The 0/90° and −45/45° orientation primary windings can be driven simultaneously in series or independently. FIG. 4 shows a top view of the sensor conductors when the layers are stacked. In the design of the quadridirectional sensor shown in FIG. 3, the secondary elements' length is set to $l=\lambda\sqrt{2}$, making them insensitive to primary windings at both 45° and −45°, and they are centered in a way that makes them insensitive to primary windings at 90°. Note that −45° and 45° are the only angles that would allow secondary elements to be insensitive to both 0° and 90° primary windings. In the discussion associated with the quadridirectional sensor of FIG. 3, it was convenient to describe the operation in terms of stacked pairs of bidirectional sensors. However, the directions and orientations of the primary windings for each layer can be in any order. Adjacent layers are not required to be at 90° angles with respect to each other.

Clearly, variations on the test circuit designs are possible based on the described approach. For example, it is preferred to have the sense elements in the same layer as the primary winding associated with the sense element. Alternatively, the sense elements may be placed on other layers and without primary winding conductors if desired. However, this increases the thickness of the sensor and can reduce its flexibility for conforming to material surface. Also, other sensor configurations can also be used as long as one of the flux canceling mechanisms described above is used. For example, a tridirectional sensor could have primary windings oriented at angles of 0°, 60° and −60° (120°) with a sense element length of $l=2\lambda/\sqrt{3}$. Furthermore, a variety of connections can be made to the sense elements. For example, for the drive winding oriented to provide sensitivity in the axial direction, individual connections can be made to each of the sense elements to improve the spatial resolution of the measurements. Cross-connecting the sense elements then provides a single output for each of the other orientations so that seven measurement channels are used. This can simplify the instrumentation and permits a combination of temperature, stress, and proximity measurements at the same time.

One application for this multi-directional sensor is the measurement of torque on a rotating shaft. Torque in a shaft results in stresses oriented at ±45° from the axial direction. Thus the magnetic permeability, which is a strong function of stress for ferromagnetic materials such as steels, should be measured in these two directions in order to determine the torque. However, stresses may also be present due to axial and bending loads. Permeability data from all four directions (0°, 90°, −45°, and 45°) at multiple circumferential locations can be used to independently measure these various stresses, and it can also be used to minimize the measurement's unwanted dependence on material property variations in the shaft, hysteresis in the permeability/stress relationship, temperature, vibration, etc. The array format of FIG. 5, which illustrates three quadridirectional MWM sensors 44 fabricated onto a common substrate as a sensor array 46, allows three locations to be monitored simultaneously. Adjacent quadridirectional sensors may be oriented at 45° with respect to each other so that if only one set of primaries is driven then the directions of sensitivity for the sensors will alternate. Depending upon the size of the shaft, additional or longer arrays can be used. For example, if three arrays are required to provide coverage around the circumference, this results in 9 locations. At each location the properties are measured in four directions, which results in a total of 36 measurement channels. Two-dimensional arrays of such sensors could also be fabricated. These sensor palettes could be mounted on a flexible substrate and used to monitor material properties, such as temperatures and stresses, over wide areas, for example, on bridge members and pipelines, and on the opposite surface of a material during machining, during shot peening or forming, to monitor residual stresses.

Figure 6:
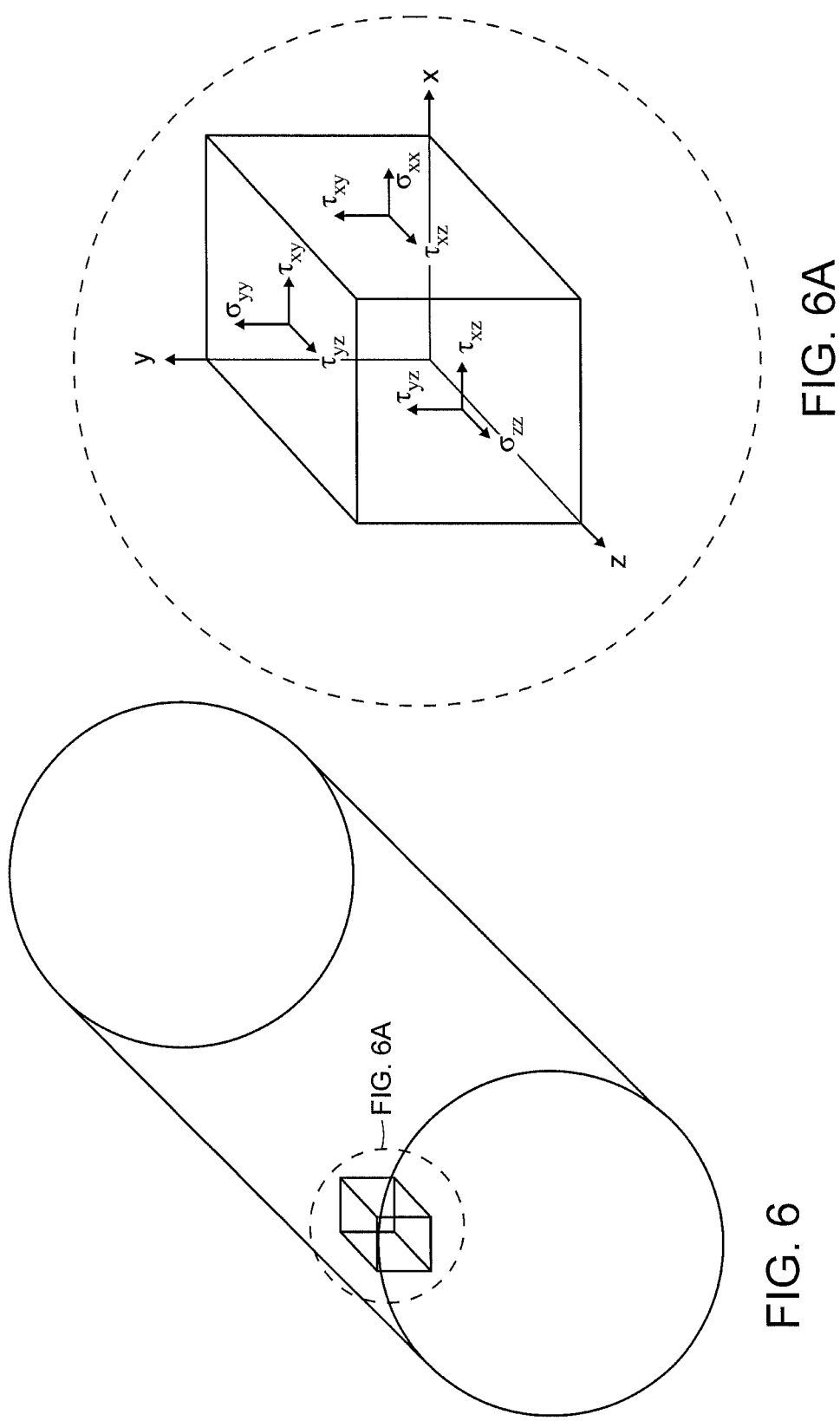
Figure 7:
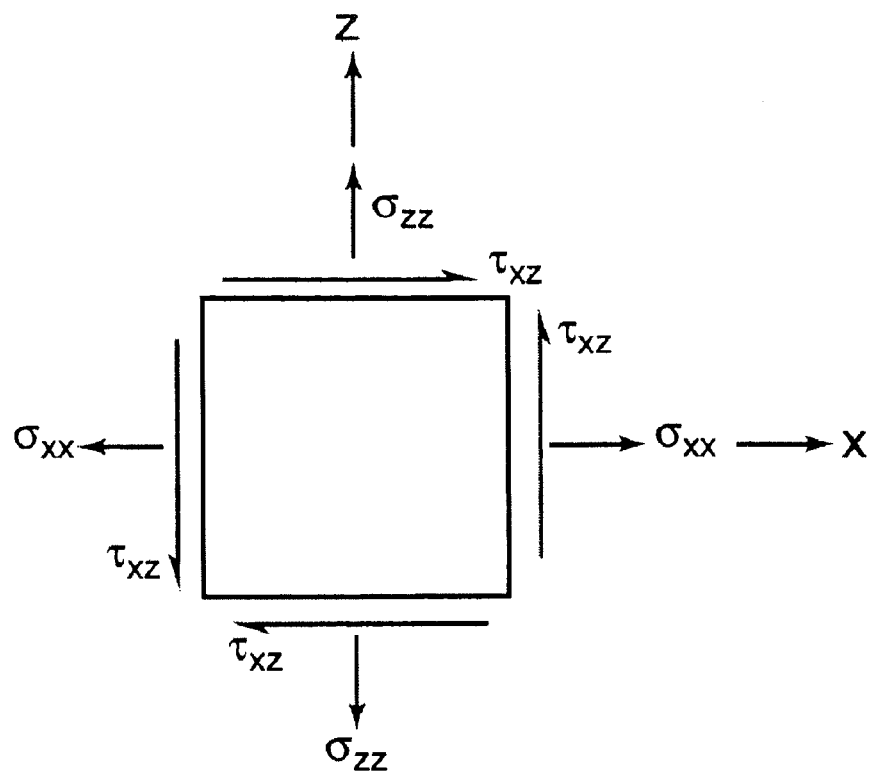
FIG. 7 shows a schematic drawing for a two-dimensional surface stress state.

In operation, the multi-directional sensors can be embedded between material layers or behind a part being processed in order to monitor the material properties and material condition during processing. The sensors could be used to measure properties in multiple directions simultaneously during processing and these properties could be used monitor the quality of the process and could even be used as inputs for a controller to control the process. Example processing operations include those which add material or change material properties on the surface, such as shot peening, friction stir welding, laser shock peening, coating, heat treating, forming, machining, and milling. Example material properties include magnetic permeability, electrical conductivity, and dielectric permittivity while example material conditions of interest for process control include strength, temperature, stress, and velocity. Similarly, the sensor could be embedded within a device that controls another device as part of the process control. To understand the stress components better, consider the geometry of FIGS. 6 and 6A. In a generic stress state there are six components of stress. Three of these components are normal stresses and three are shear stresses. Since the magnetic field sensors described above monitor the material through the surface, three of these stresses are zero, since there will be no forces acting on the surface. Using the coordinate system of FIGS. 6 and 6A, these stresses are $\sigma_{YY}$, $\tau_{XY}$, and $\tau_{YZ}$. With this constraint, a two-dimensional stress-state is sufficient to fully describe the loading. Such a two-dimensional stress-state is shown in FIG. 7.

Figure 8:
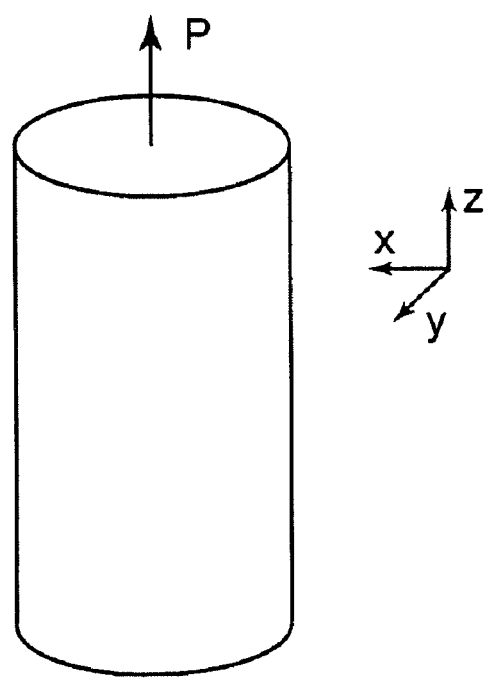
FIG. 8 shows a schematic drawing for a pure tension loading mode for a cylindrical shaft.
Figure 9:
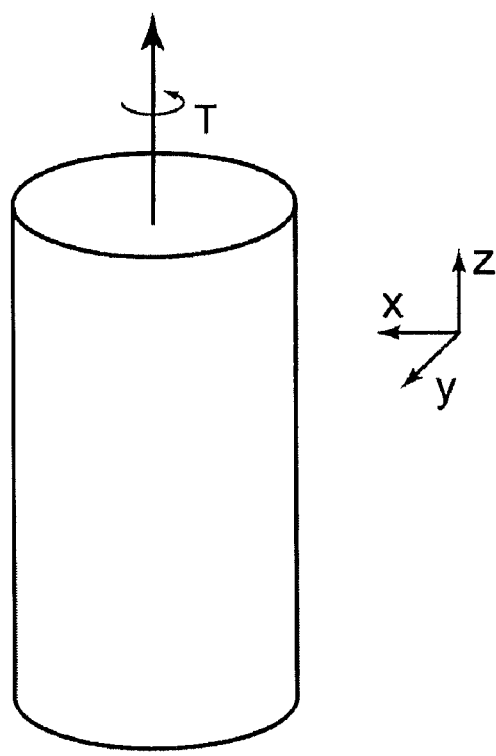
FIG. 9 shows a schematic drawing for a pure torsion loading mode for a cylindrical shaft.
Figure 10:
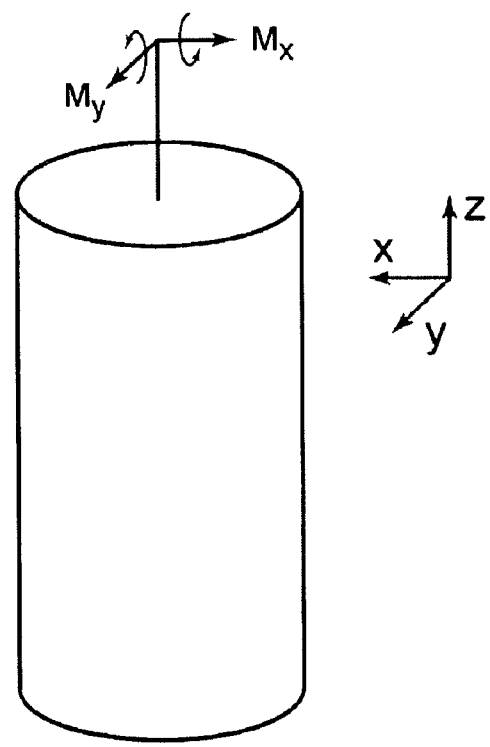
FIG. 10 shows a schematic drawing for a pure bending loading mode for a cylindrical shaft.

In many applications, the net loading on a material or component is the combined result of multiple loading modes. Assuming a linearly elastic material, multiple loading modes can be added together or superimposed to produce a combined loading state. As a specific example, the loading modes to be considered are pure tension, pure torsion, and pure bending on a cylindrical shaft. The shaft is assumed to be circular and of constant cross section since this is the most common geometry used for torque transmission. This includes both solid and hollow shafts. In pure tension, the tension is assumed to be applied in the axial (z) direction (see FIG. 8). It follows that the stress can be expressed as $\sigma_{zz}=P/A$, with P the applied axial load (force) and A the cross-sectional area. In pure torsion, the torsion load is assumed to be applied in the axial (z) direction (see FIG. 9). It follows that the shear stress is only at the surface of the shaft and can be expressed as $\tau=TR_O/J$, with $R_O$ the radial distance from the axis, J the polar moment of inertia, and T the applied torque. In pure bending, it is assumed that only a pure moment is being applied (i.e., no shear) in the XY plane of FIG. 10. Even in the case of a cantilevered load, the bending stresses are usually much larger than shear stresses so the shear stresses can be ignored. Also, shear stresses due to bending must be zero at the surface, further minimizing the effect on the surface stress measurement. The result is that the bending stress can be expressed as $\sigma_{zz}=(R_O/I)(M_X \sin \theta - M_Y \cos \theta)$ with/the moment of inertia and $\theta$ the angle between the point of interest and the x axis, and $M_X$ and $M_Y$ are the moments (torques). It follows that the combined loading stress can be obtained by superposition as $\sigma_{zz}+P/A+(R_O/I)(M_X \sin \theta - M_Y \cos \theta)$ with $\sigma_{zz}=0$.

In operation, measurements are made with each sense element to obtain at least one electrical property and an additional property, where the electrical property is used to determine a material condition, such as stress and the additional property is used to obtain another feature of interest. For example, typical properties obtained from multiple excitation frequency measurements are the magnetic permeability and electrical conductivity, which are electrical properties, and lift-off or sensor proximity to the test material surface. This allows material electrical properties to be measured at multiple orientations without having to move the sensor. In an application, the magnetic permeability, electrical conductivity, and lift-off are measured for each sense element orientation. This allows load-related parameters to be determined in each orientation, such as torque, bending load, axial load, temperature, vibration, or rotational speed. For comparison, U.S. patent application Ser. No. 11/702,422, filed Feb. 5, 2007, the entire teachings of which are incorporated herein by reference, describes the use of magnetic field sensors at multiple locations around a rotating component for assessing the condition of the rotation component, but it does not teach of integrated constructs that provide multiple orientation responses within the same sensor footprint. Similarly, U.S. Provisional Application No. 60/934,191, filed Jun. 12, 2007, the entire teachings of which are incorporated herein by reference, describes extending the use of magnetic field sensors to perform non-contact torque measurements of rotating members.

Also in operation, the excitation of the drive or primary windings in each layer can be adjusted or selected based upon the property measurement application of interest. In one approach, the excitation of the different primary windings can be synchronized to measure coupling effects between directions for materials that have coupled magnetic properties. The drives can be varied so that primary is excited with a DC signal while the others have AC excitations or all can be excited with AC excitations either with different phase shifts, which can create a rotating field direction, or with different excitation frequencies. This could be used, for example, with suspensions of ferromagnetic particles such as ferrofluids, with the excitation frequency and phase shift adjusted to synchronize the field directions with the fluid motion.

In another approach the sensing elements are used between different drive windings and sense elements to provide sensitivity to other measurement modes. For example, for a magnetizable material, hysteresis effects or even the magnetization (B/H) curve can be traced by exciting one primary winding and measuring a response with one or more non-associated sense elements. Similarly, a DC bias field could be excited with one winding and the response measured in the orthogonal direction. It is also possible to place another drive winding or excitation coil around a sensor to apply a uniform magnetic field normal to the sensor surface.

The multi-dimensional sensor could be used for testing on a variety of other applications. Examples include magnetic particle suspensions; electronic materials; laboratory or test tube samples; object characterization and assessment; and implants such as those used in dental applications. Typically it is beneficial to convert the sense element response into more meaningful physical parameters associated with the test material, such as an electrical conductivity or magnetic permeability. In addition, if the sensor lift-off or proximity to the test material is determined, this provides self-diagnostic information about the state of the sensor, which is particularly useful for surface-mounted sensor arrays where access to the sensor array may be limited.

An efficient method for converting the sensor response into material or geometric properties is to use grid measurement methods. These methods map two known values, such as the magnitude and phase or real and imaginary parts of the sensor impedance, into the properties to be determined. The measurement grids are two-dimensional databases that can be visualized as "grids" that relate two measured parameters to two unknowns, such as the magnetic permeability (or electrical conductivity) and lift-off (where lift-off is defined as the proximity of the test material to the plane of the MWM windings). For the characterization of coatings or surface layer properties, three-(or more)-dimensional versions of the measurement grids, called lattices and hyperlattices, respectively, can be used. Alternatively, the surface layer parameters can be determined from numerical algorithms that minimize the error between the measurements and the predicted responses from the sensor, or by intelligent interpolation search methods within the grids, lattices or hyperlattices.

Figure 11:
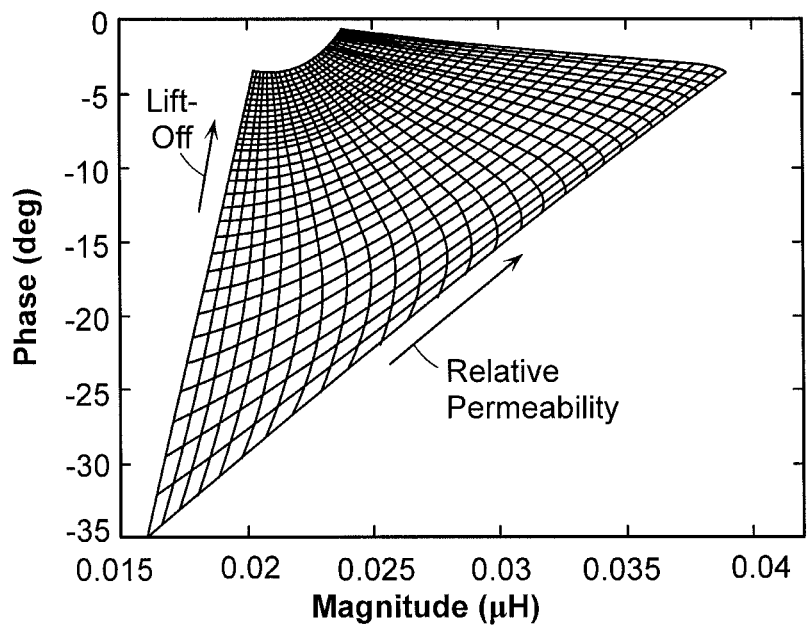
FIG. 11 shows a representative measurement grid relating the magnitude and phase of the sensor terminal impedance to the lift-off and magnetic permeability.
Figure 12:
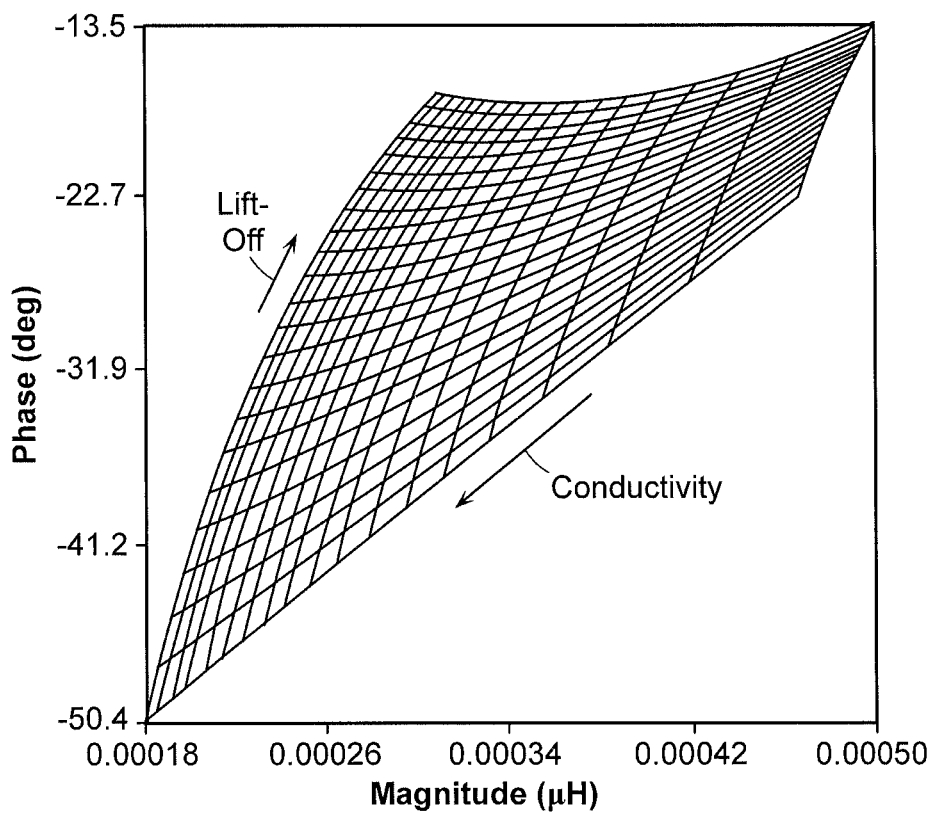
FIG. 12 shows a representative measurement grid relating the magnitude and phase of the sensor terminal impedance to the lift-off and electrical conductivity.

For ferromagnetic materials, such as many steels, a measurement grid can provide a conversion of raw data to magnetic permeability and lift-off. A representative measurement grid for ferromagnetic materials is illustrated in FIG. 11. A representative measurement grid for a low-conductivity non-magnetic alloy (e.g., titanium alloys, some superalloys, and austenitic stainless steels) is illustrated in FIG. 12. For coated materials, such as cadmium and cadmium alloys on steels, the properties of the coatings can be incorporated into the model response for the sensor so that the measurement grid accurately reflects, for example, the permeability variations of substrate material with stress and the lift-off. Lattices and hyperlattices can be used to include variations in coating properties (thickness, conductivity, permeability), over the imaging region of interest. The variation in the coating can be corrected for each sensor or sense element individually to improve the measurement of permeability in the substrate for the purpose of assessing stresses. The effective property can also be a layer thickness, which is particularly suitable for coated systems. For example, the thickness of paint between the sensor and the surface of the material under examination, such as a steel ring gear can be allowed to vary. Since the sensor independently measures the magnetic permeability and lift-off, the measured permeability is effectively compensated for the paint thickness variations.

Figure 13:
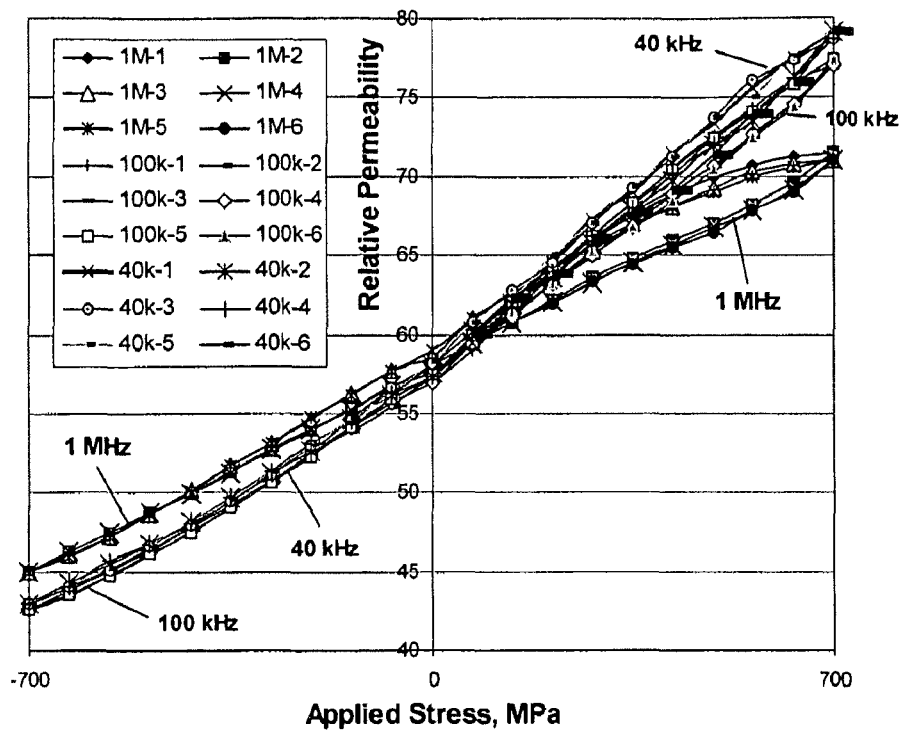
FIG. 13 shows the magnetic permeability variation with bending stress in a shot-peened high-strength steel specimen.

For monitoring the stress on a material, the effective property being measured by the sensor needs to be stress-(or strain)-dependent. For magnetizable materials, such as steels, this effective property is typically the magnetic permeability. FIG. 13 shows an example magnetic permeability variation with applied stress for a shot-peened ferromagnetic steel at several excitation frequencies. Also, for sensors, such as those shown in FIGS. 1-5, that have the capability to perform directional permeability measurements, the directions of the principal stresses can be determined. This orientation dependence can also affect the sensitivity of the sensor to the dynamic stresses from the rotating component. For non-magnetizable materials, the stress-(or strain)-dependent material property is typically the electrical conductivity. As described for example in U.S. patent application Ser. No. 11/292,146, filed Nov. 30, 2005, the entire teachings of which are incorporated herein by reference, the electrical conductivity of numerous metals varies with the applied stress. Both of the above references also describe performing dynamic stress measurements as a material is being mechanically loaded. Another option for the monitoring of non-magnetic materials is to add a ferromagnetic coating, such as a cobalt- or nickel-based alloy, as a diagnostic layer that can enhance the observability of the state of the material of interest. For composites or otherwise heterogeneous materials, the effective conductivity or effective complex permeability can be used to measure the stress.

For rotating cylindrical components, the sensors can be mounted around the component in a variety of ways. Typically, even though the component of interest is rotating, the sensors are kept stationary. For example, the sensors can be mounted in a non-contact configuration where an air gap is intentionally introduced or maintained to avoid direct contact between the sensor and the test material. As another example, the sensors are mounted to a ring that encircles the rotating component. The sensors may be placed around the entire circumference of the ring, or only at several discrete locations. Then, at each measurement time each sensor will reflect the interaction between the ring and rotating component at a specific rotational position. Subsequent measurements are generally taken at other rotational positions, since the rotation rate and data acquisition rates are generally not synchronized. The output of the sensors can be used to detect a misalignment of the rotating body through its interaction with the ring material, may be used to adjust the balance, and can even determine if a component is operating within an acceptable range of stress variation. Note that the sensors can be bonded to the surface using an adhesive or epoxy. Alternatively, the sensors can be mounted on a substrate, routed around a closed loop and tightened without a bonding material to monitor stress or strain, and then removed without affecting the object under test or requiring significant surface preparation.

Similarly, the measurement of the sensor or sense element responses can be performed in a variety of ways. For example, for magnetic field sensors, the drive windings can be series connected so that each sensor is active at the same time. However, if a large number of sensors are to be monitored, the sensors can be grouped to have a common drive and monitored by separate electronics modules within each group. Groups of individual sense elements within a sensor array may also be connected together to increase the sense area. This reduces the number of sense areas that need to be monitored and permits averaging of the stress or strain, avoids effects of local property variations, and can improve the signal-to-noise ratio. Multiplexing between the sense elements or groups of sense elements enables monitoring of even more sensors for a given instrument having a limited number of data acquisition channels, but this dilutes the ability to monitor all channels simultaneously.

In operation, the sensors can be used for long-term monitoring or short-term diagnosis of performance. Permanently mounted sensors are left in place for long periods of time and used for monitoring during operation or for convenient examinations. The sensors are typically mounted in difficult-to-access locations with cables routed to easy access locations. On-board electronic instrumentation may be used for continuous monitoring while off-board portable electronics can occasionally be plugged into the cables to obtain the sense element responses. In contrast, for short-term diagnosis, the sensors are mounted in a temporary fashion, such as with a weak bond or adhesive material, and on-board instrumentation is used to record data for short periods of vehicle operation, such as during a flight of a rotary wing aircraft. This allows the condition of the vehicle to be monitored for diagnostic purposes, but the sensors and instrumentation can be removed and even reused on another vehicle.

Also, in operation, the calibration of the sensors can be performed in a variety of ways. For sensors that have a response which can be accurately modeled, for example with the measurement grids of FIG. 11 and FIG. 12, measurements of the sensor response in air may be sufficient to adjust the instrument settings so that reliable property measurements can be obtained. Alternatively, one or more measurements with the sensor against a reference material can be used to make these instrument adjustments. The material properties determined by the sensors can in turn be related to the stress or strain through coupon measurements. This relation can be obtained by applying a prescribed load to a coupon with one or more sensors mounted on the coupon. Alternatively, the relation could be obtained from controlled loads applied to a component resembling the application of interest, with one or more of the sensors mounted to it. In both cases, a strain gage can be mounted temporarily on the test material during loading to provide a local measurement of strain to build correlation tables between the measured electrical property (such as magnetic permeability or electrical conductivity) and strain. In one embodiment, a cylindrical element is loaded using pure torque loading, with appropriate strain gages, pure tension loading, with appropriate strain gages, or axial loading, as well as combinations of these. In another embodiment the bending and axial stress are first estimated and then subtracted from a complex loading mode to estimate pure torque stress. It follows that these pure torque stresses then have a direction of zero load (e.g., axial) where, in-turn, a material property can be estimated independent of the complex loading modes and used to enhance the measurements. For example, the electrical conductivity could be estimated in the zero load direction for the pure torque stress and then used to correct for temperature variations. While the above discussion emphasized the relation between a material property and the stress, strain, and load, empirical relationships between the sensor response and the state of interest can be stored to convert the sensor output to the desired state measurement for each sensor. Note also that thermocouples can be added to the measurement system to enable correction for temperature variations.

Figure 14:
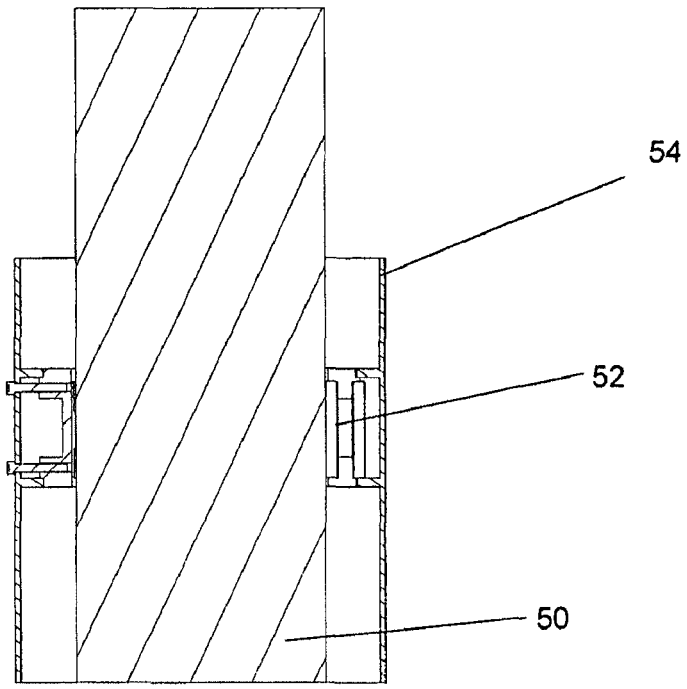
FIG. 14 shows a cross-sectional view of a cylindrical sleeve and sensor inserts for non-contact torque monitoring of a rotating shaft.
Figure 15:
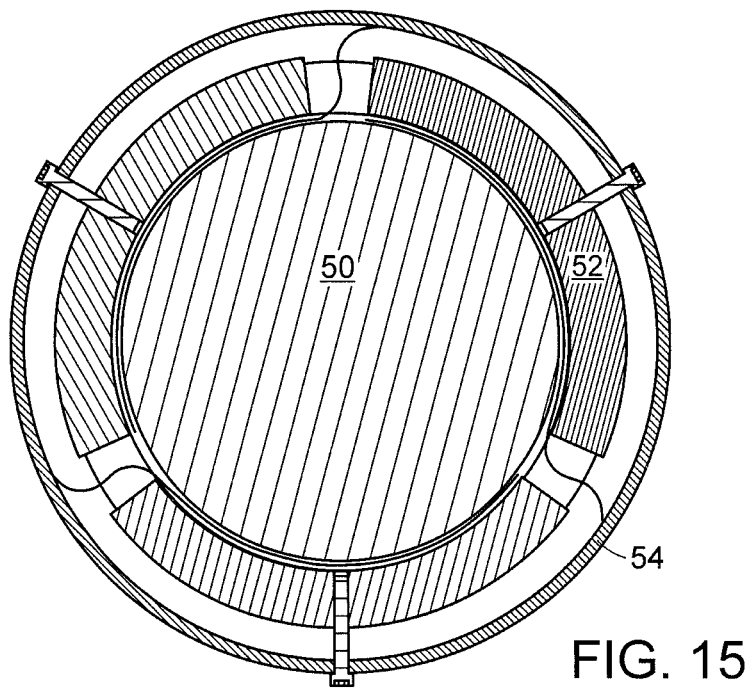
FIG. 15 shows a top view of a cylindrical sleeve and sensor inserts for non-contact torque monitoring of a rotating shaft.

FIG. 14 illustrates an example configuration for non-contact torque measurements on a rotorcraft. The quadridirectional sensors of FIG. 3 and FIG. 4 are located on the inner surface of the inserts 52 so that the sensor is 0.050 inches from the surface of the rotating shaft 50. The insert 52 sits within a cylindrical sleeve 54 with non-conducting supports behind the sensor that in turn is located on the top of the gearbox. By monitoring the shaft, the output torque from the gearbox can be obtained. FIG. 15 shows a top view of this configuration. The sensors in this configuration are reusable and also permit monitoring of properties through coatings. Similar applications are measurements of the torque on tool bits, stress measurement for bridge steels, and loads in composites, such as those where the layout of the composite includes 0°/90° and 45°/−45° plies.

In operation, each quadridirectional sensor can provide a measurement of the stress-dependent magnetic permeability of the shaft in four directions, as well as an estimate of the stress-independent electrical conductivity and sensor lift-off.

This can be used to correct for temperature variations. For example, a conductivity functional dependence can be assumed or determined empirically for the test material. Measurements of the temperature and conductivity at a nominal load can be used to establish a baseline value for the functional dependence. Then, measurements at a different temperature can be used to determine or validate the functional dependence. Note that the temperature is the parameter of interest, not the conductivity, which is measured directly. The correction associated with the temperature can then be used to adjust the sensor responses to provide a temperature-compensated value for each magnetic permeability. Note also that multiple frequency excitations can be used to measure property profiles or spatial variations in properties with depth into the test material.

Non-contact monitoring with a multi-directional sensor allows the lift-off (sensor proximity to the material surface) to provide additional information about the operation of a component. For example, consider a multi-directional sensor placed proximate to a rotating shaft. By measuring the lift-off at several positions around the circumference of the shaft, any deflections in the shaft can be used to calculate the bending modes and other loads on the shaft. The lift-off measurements could be used to correct or calibrate magnetic stress gage measurements or the torque measurements.

As an illustration, consider a torque measurement example for a cylindrical shaft. This shaft represents a wide variety of applications, such as the rotor of a helicopter or a tool used in a machining or drilling operation. Monitoring of the torque, for example, permits real-time force monitoring and control. Other parameters only need to be determined to the extent that they affect the parameter of interest (torque). In this case, the temperature of the shaft only needs to be known to the extent necessary to remove any temperature dependence on the material properties used to assess the torque, such as the magnetic permeability. The absolute value of temperature is not important and could be, for example, offset by a constant value without directly affecting the robustness of the measurement. Fortunately, when multiple material properties are being determined in a measurement, such as the magnetic permeability and electrical conductivity, the property that is relatively insensitive to stress, such as the electrical conductivity, can be used to estimate the temperature, while the stress dependent property, such as the magnetic permeability, can be used to determine the torque. Similarly, since the torque should be the same around the shaft, the torque measurement can be assumed to be an average of the torque measurements at each location. However, the bending stresses will be zero if averaged around the circumference, so approximate corrections for bending should be sufficient to determine torque. Lift-off can be the parameter used to estimate the bending stresses. When a shaft is subjected to bending modes, a deflection will occur that can be measured by the lift-off of each sensor. Given a predefined relationship between bending stress and shaft deflection, either empirically or analytically derived, the bending stresses can be estimated based on shaft deflection.

Figure 16:
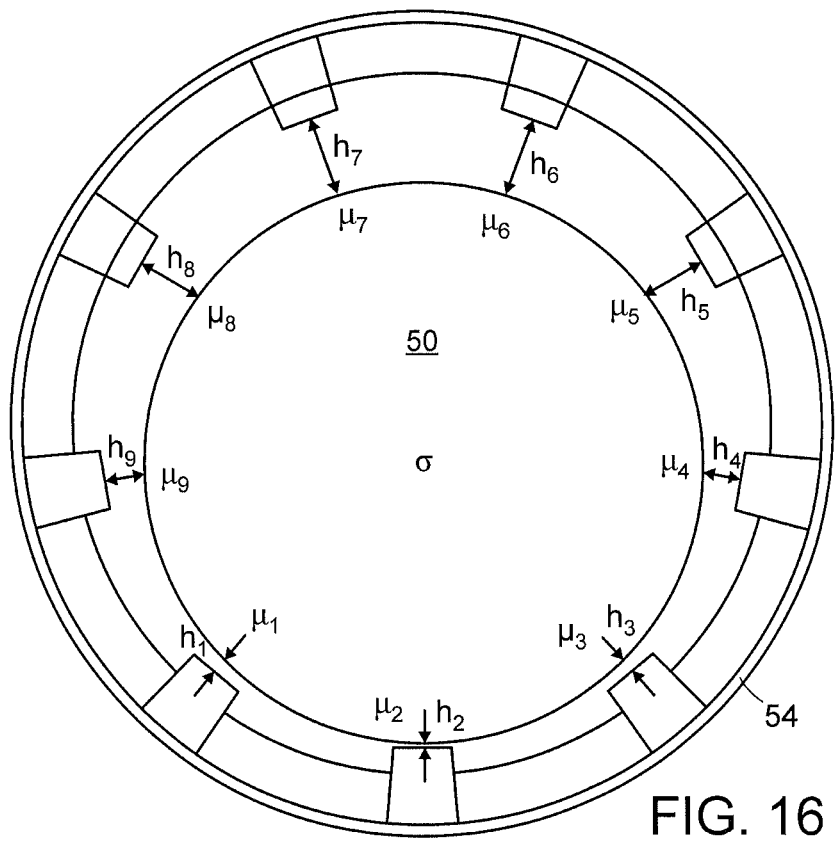
FIG. 16 shows a cross-sectional view of a cylindrical sleeve and sensors placed around an offset, rotating shaft.

FIG. 16 shows a cross-sectional view of a shaft offset within a housing. In this implementation, nine sense elements are being used to estimate the shaft offset based on lift-off. Permeability is being estimated at the same nine locations in four orientations using a sensor such as that shown in FIG. 4. The electrical conductivity is typically a linear function of temperature and can be assumed to change uniformly with temperature for all locations and orientations.

Note that shaft velocity and angular position will be important if the material properties of the shaft vary significantly with angular position. In this case, a signature can be developed of the permeability variation of the shaft with position. This signature can be used to compensate for the variation after load is applied. If no angular position data is available, then a sense element in the no-load direction can be used to track the permeability changes, which can them be compared to the signature to give shaft velocity and angular position. This direction can also be used to compensate for temperature effects. Since the permeability should have a known and fixed value, any changes in the measured properties should be due to temperature causing a conductivity change in the material. This information can be used to correct the measurements at other locations and orientations for the change in temperature.

Several example measurements have been performed to demonstrate the operation of the multi-directional sensors. For example, consider the quadridirectional sensor array of FIG. 5 with one pair of drive windings excited. For the sensors in locations 1 and 3 the excited drive corresponds to the 0° and 90° orientations while for location 2 the excited drive corresponds to the −45° and 45° orientations. Table 1 shows the raw measured signal magnitude of the channels when one pair of complementary orthogonal primary windings is excited. Each channel corresponds to one group of sense elements associated with a primary winding direction. This clearly shows that the sense elements respond primarily to the associated excited primary windings of interest and there is minimal cross-talk from the non-associated primary windings.

TABLE 1

| Sense element responses when one pair of orthogonal drive windings is excited. | | | | |
|---|---|---|---|---|
| Location | 0° | 90° | 45° | −45° |
| Location 1 (Channels 1-4) | 0.966 | 1.025 | 0.031 | 0.016 |
| Location 2 (Channels 5-8) | 0.007 | 0.026 | 0.886 | 0.796 |
| Location 3 (Channels 9-12) | 0.946 | 0.928 | 0.037 | 0.002 |

Figure 5:
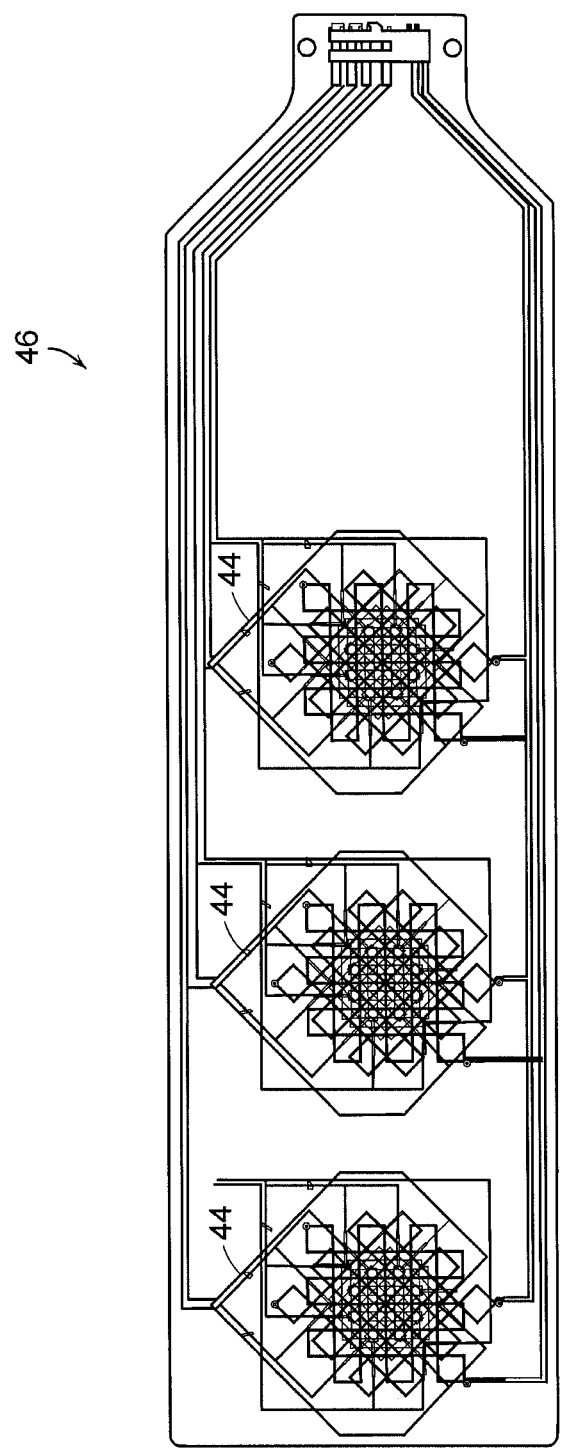
FIG. 5 shows a top view drawing of an array having three quadridirectional MWM sensors.
Figure 17:
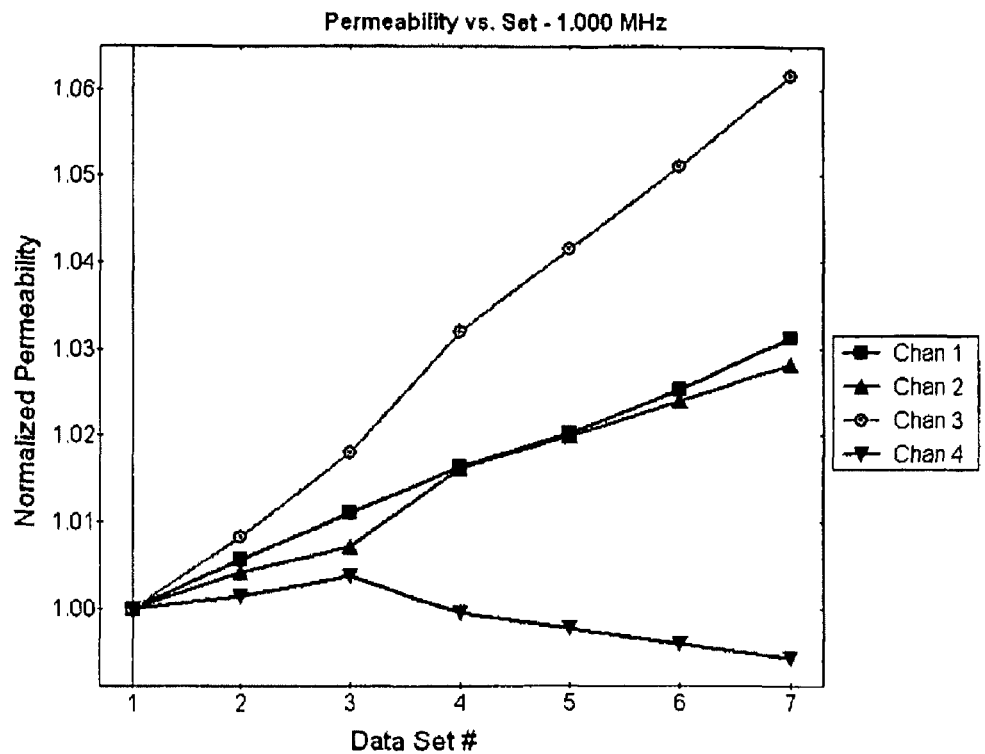
FIG. 17 shows the magnetic permeability variation with increasing stress for a quadridirectional sensor in one orientation.
Figure 18:
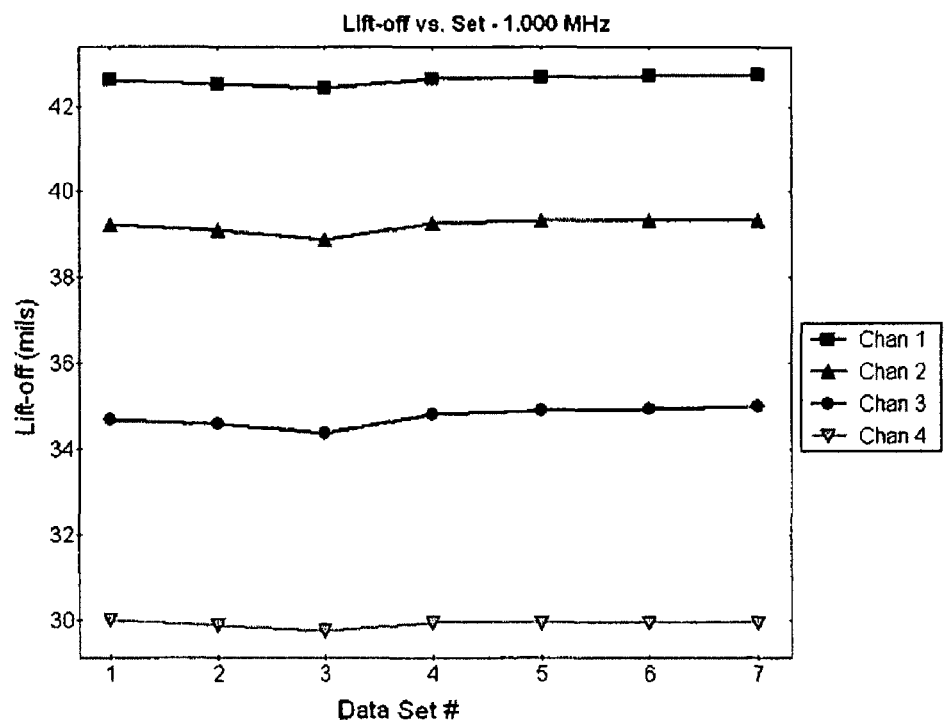
FIG. 18 shows the lift-off corresponding to the measurement of FIG. 17.
Figure 19:
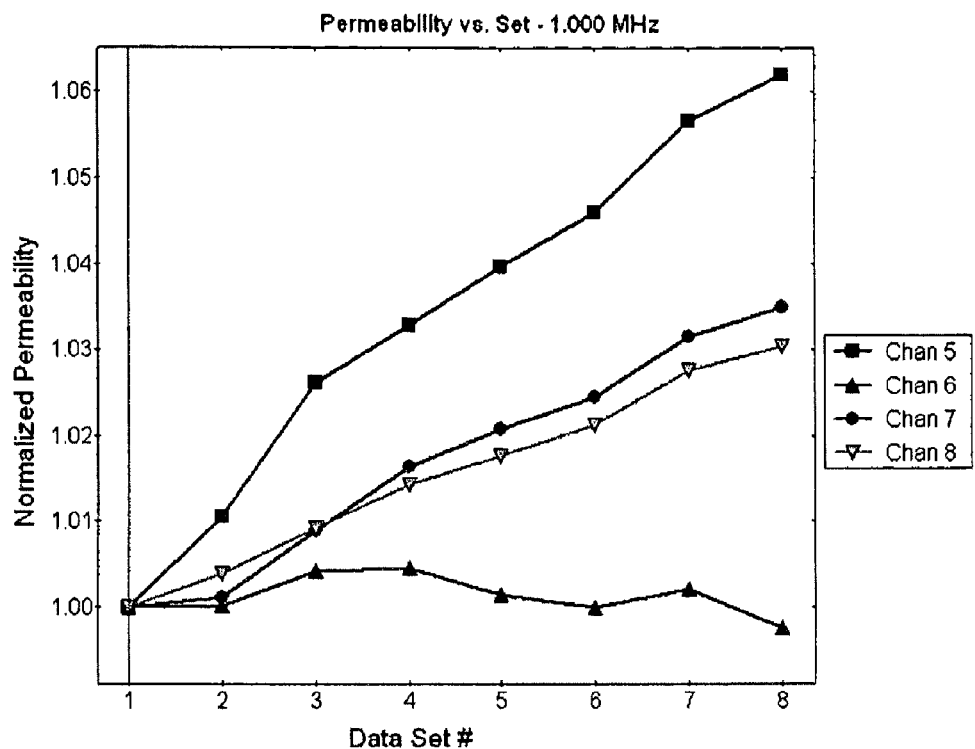
FIG. 19 shows the magnetic permeability variation with increasing stress for a quadridirectional sensor oriented at −45° with respect to the sensor in FIG. 17.
Figure 20:
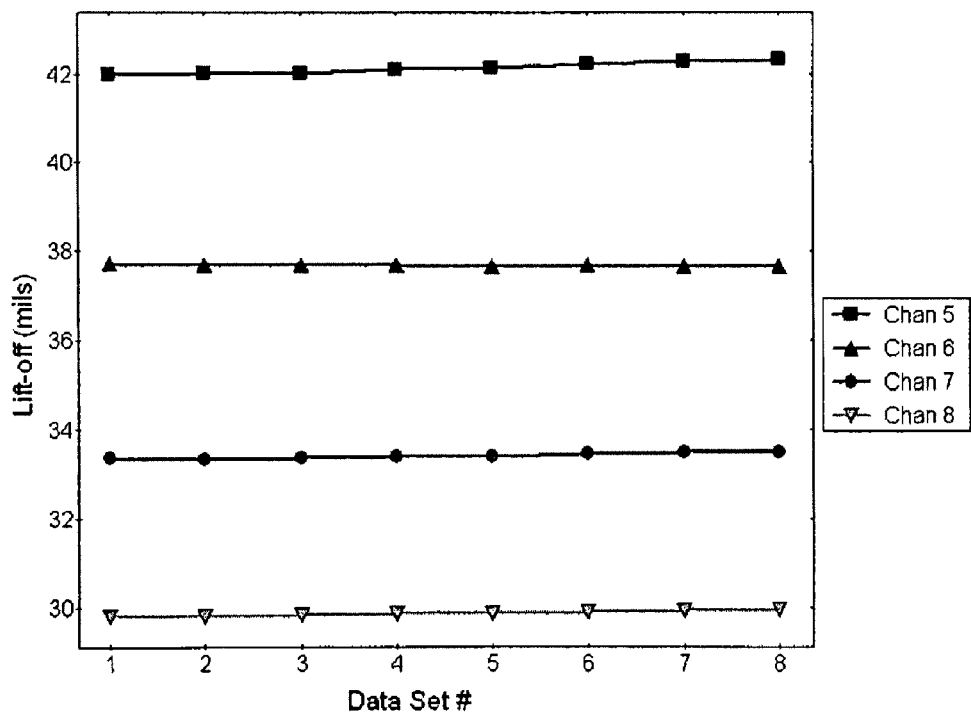
FIG. 20 shows the lift-off corresponding to the measurement of FIG. 19.

In another example set of measurements, the magnetic permeability of a steel was monitored with the sensor array of FIG. 5 as the steel was mechanically loaded. In this case, the sensor array was positioned near a magnetizable steel test material of thickness 0.061 in. and nominal electrical conductivity of 2.5% IACS, with a lift-off of approximately 0.030 in. An air calibration was performed and the data for each sense element was processed using a magnetic permeability/lift-off measurement grid. FIG. 17 shows the magnetic permeability and FIG. 18 shows the lift-off variation with stress, as the steel sample was bent. The magnetic permeability changed for the sense element directions appropriate for the stress variation while the estimated lift-off was essentially constant. More specifically, Chan. 3, whose direction of sensitivity to magnetic permeability was aligned with the direction of applied stress, showed the greatest change, while Chan. 4, which was oriented at 90° to it, changed the least, and the remaining two channels, which were at ±45° to the applied stress changed by similar amounts, of lesser magnitude than Chan. 3. The differences in lift-off between each sense element direction or measurement channel is consistent with the sense elements being at different layers in the sensor stack-up. Similar results were obtained when the sensor direction was rotated by 45°, as shown in FIG. 19 for the magnetic permeability and FIG.

20 for the lift-off variation, except that the roles of the sense elements were appropriately reordered, while the lift-offs remained unchanged.

As another example, measurements were performed with the sensor array of FIG. 5 placed around a magnetizable steel shaft while it was mechanically loaded in pure torsion. The shaft had an outside diameter of 2.0 in. and a 0.080-in. wall thickness. The shaft was supported in a lathe and torque was applied using a 48-in. level arm with weights of 350 lbs applied at radial distances of 24, 30, and 36 in. with respect to the shaft axis. Measurements were taken at three locations with four sense elements at each location, using the quadri-directional sensor array shown in FIG. 5. One sensor was located at the top of the shaft, while the other two were placed ±120° away. The four sense elements at each location were oriented to be sensitive to magnetic permeability variations along the shaft axis (0°), perpendicular to the shaft axis (90°), and at −45° and 45° orientations to the axis. In this particular test, only pure torsion was applied to the shaft. Consequently, the principal stresses occur at ±45° with respect to the shaft axis.

Figure 21:
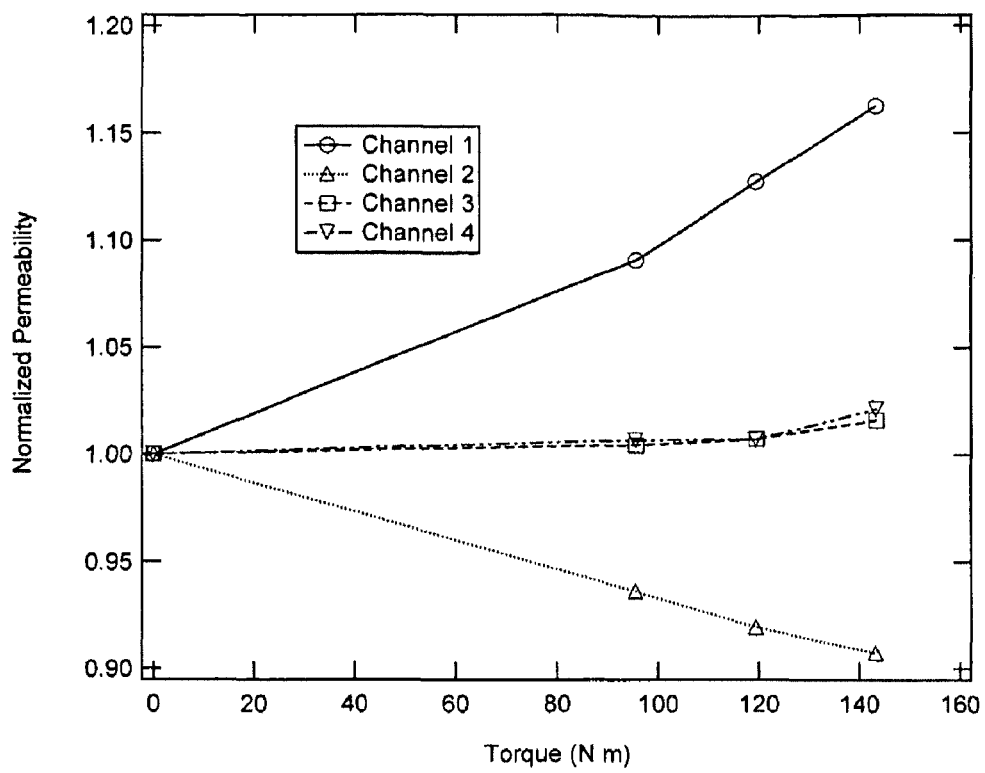
FIG. 21 shows the magnetic permeability variation with increasing torque for a quadridirectional sensor mounted on a steel cylinder.
Figure 22:
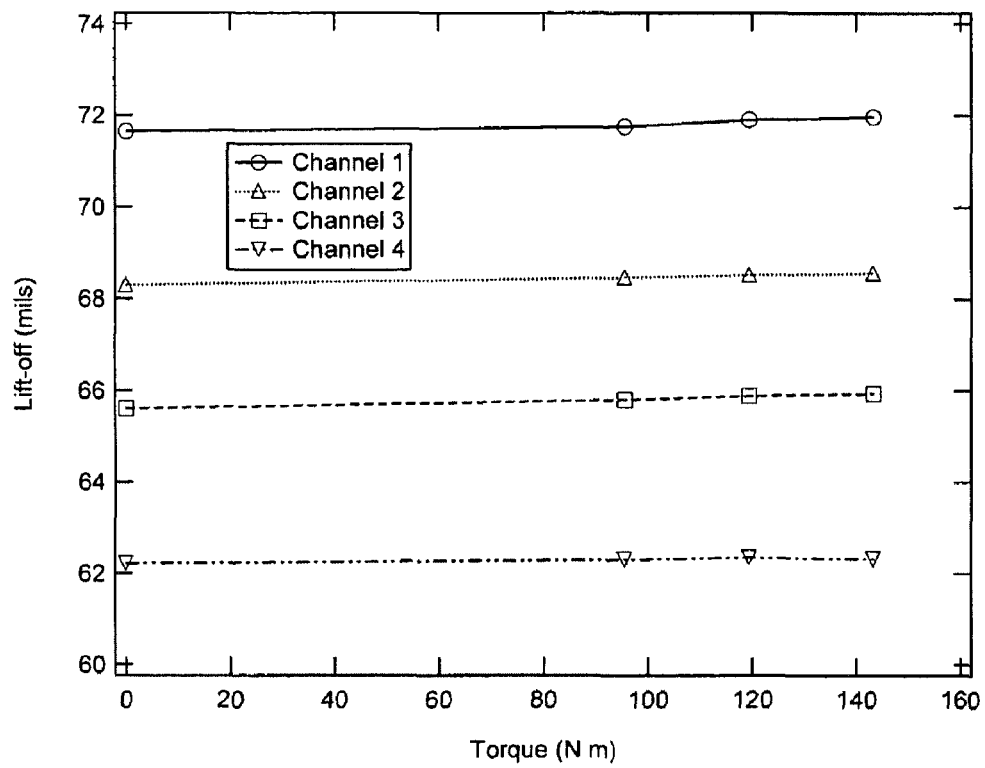
FIG. 22 shows the lift-off corresponding to the measurement of FIG. 21.

FIGS. 21 and 22 show the sensor response with applied torque. The stresses in the shaft are zero for the 0° and 90° relative to the shaft axis (channels 3 and 4) and are equal but opposite in the ±45° orientations (channels 1 and 2). These measured changes in the magnetic permeability correspond directly to the maximum and minimum stress directions. Similar results were obtained for the other two sensors, verifying the capability of the sensors to monitor multi-directional material property variations without removing and replacing the sensor near the test material surface.

As an example illustrating the hysteresis correction, consider the permeability-stress relationship that was measured on a flat steel specimen in a bending fixture. Two MWM-Arrays were placed at right angles, the first measuring the permeability in the axial direction and the second in the transverse direction. Two conventional strain gages were also installed on the specimen, measuring the strain in the same two orientations.

Figure 23:
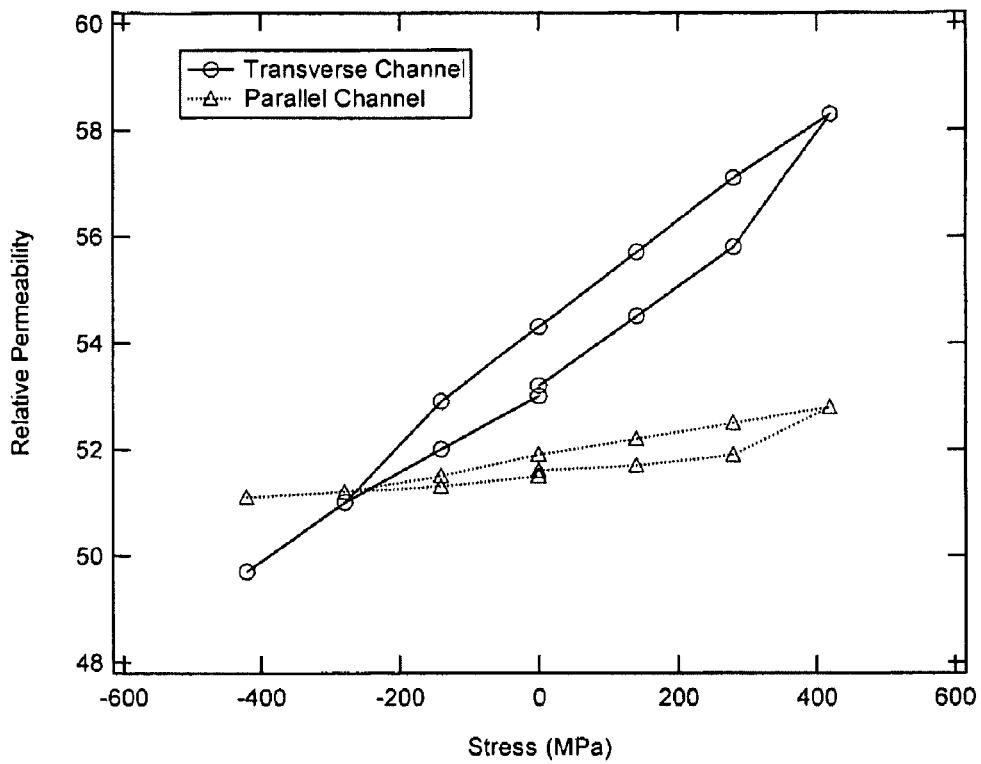
FIG. 23 shows the permeability versus stress at 0° and 90° over two stress range cycles at room temperature (68° F.).
Figure 24:
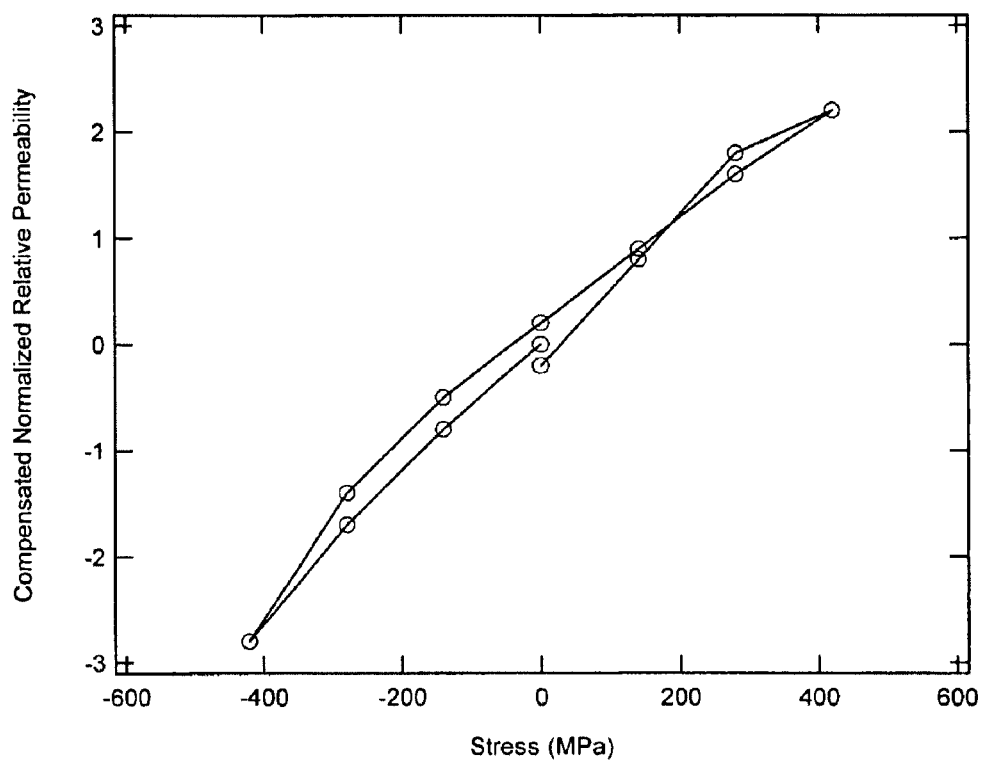
FIG. 24 shows the permeability versus stress after application of hysteresis correction.
Figure 25:
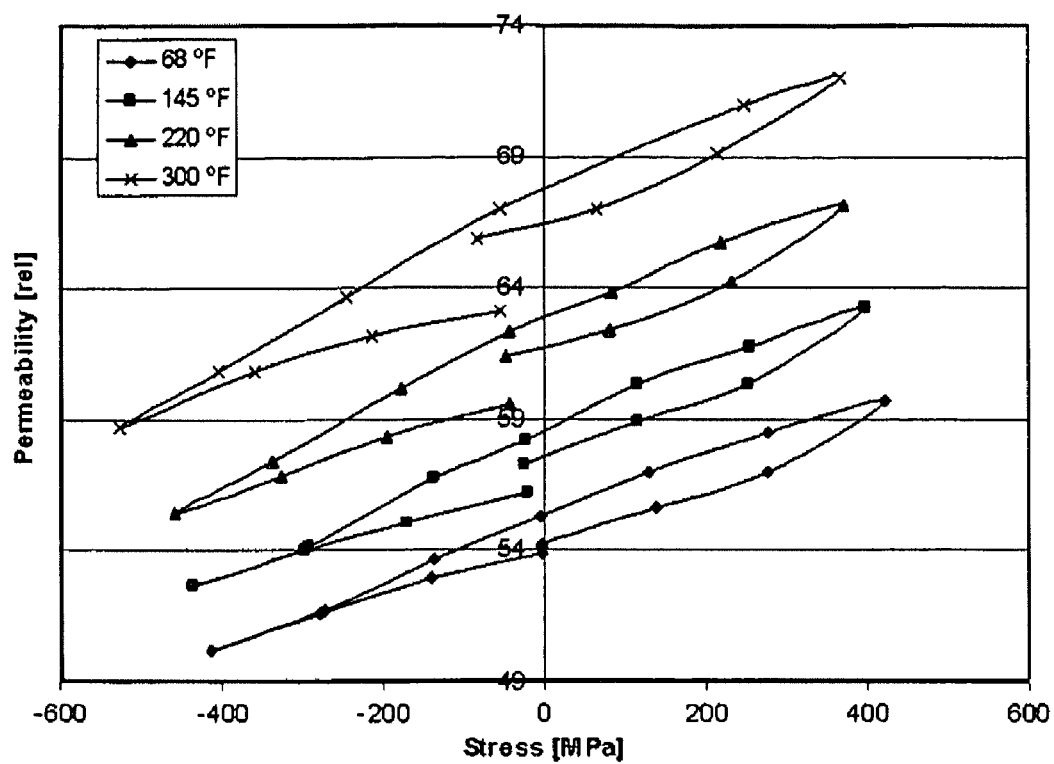
FIG. 25 shows the permeability versus stress at various temperatures.

FIG. 23 shows the permeability versus stress relation over two stress cycles while FIG. 24 shows the result of applying a simple subtraction operation to eliminate the hysteresis. As seen in the figure, the data spread in the permeability/stress relationship due to hysteresis was reduced significantly, from 0.7 to 0.18 (from 8.1% to 3.6% of the total permeability range). In this simple correction, information from only one other direction was used for the correction. In contrast with the sensor of FIG. 5, the second direction was not at the same location. Material variation from location to location contributes to noise and leads to a less-than-ideal correction for the hysteresis. The same setup demonstrated the temperature dependence of the permeability measurements. Measurements were taken over the same stress range, at several different temperatures, as shown in FIG. 25. These results indicate that the slope and loop shape do not substantially change with temperature. Normalization of these curves, for example by subtracting off the average zero stress permeability, also shows the similarity of these curves.

To support refinement of the QD-MSG, a simple static test stand was designed and fabricated. This test stand supported application of torsion and bending loads simultaneously to create multi-dimensional stress states typical of rotor shaft loading. On this test stand, several QD-MSGs were wrapped around the circumference of a hollow shaft that is representative of an actual rotor shaft. A 0.060 in. thick plastic was placed between the sensors and the shaft as a representative distance for implementation of a non-contact torque measurement on rotorcraft. Since these magnetic field sensors are not sensitive to the presence of the plastic, this plastic provided a simple means of simulating an air gap between the sensor and the shaft. Eight strain gages were also located near one of the three QD-MSGs. As described above, a solid mechanics model was used to convert the stresses at the location of each QD-MSG from the strain gage information. These stresses were used to verify the system performance and establish the correlation between magnetic permeability and stress.

Figure 26:
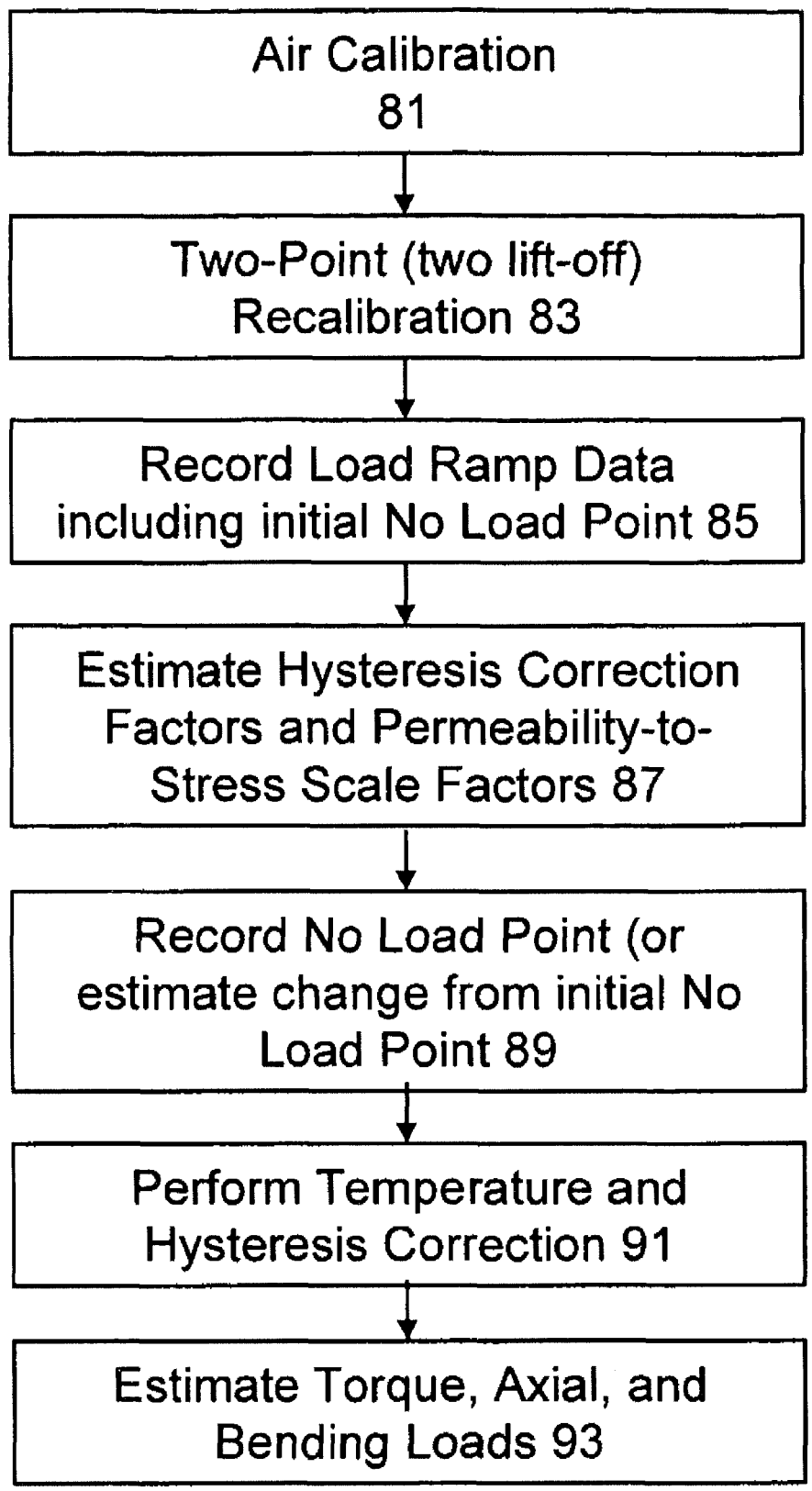
FIG. 26 provides a flow diagram that illustrates the process for converting a QD-MSG response into a non-contact load measurement.

Using the static test stand, a data-processing methodology for converting impedance measurements from the four channels in a QD-MSG to directional stress estimates was developed. It is illustrated in FIG. 26 and described as:

First, each of the four MWM sensors in a QD-MSG is calibrated simultaneously using an air/shunt calibration 81. This calibration corrects for variations in cable, electronics and sensor behavior at each sensor channel. A measurement grid (precomputed database) that converts the MWM response into permeability covers a range in the impedance (real/imaginary) space. The air calibration brings the response of each MWM close to the correct operating point. The next step 83 is a reference part recalibration that uses two measurements at two different lift-offs (proximities). This calibration refinement uses a first measurement at a lift-off different than the sensor nominal anticipated operating point and a second measurement at the nominal operating lift-off. It is assumed that the only change between the two measurements is in lift-off. This is important and care must be taken in recording these two points. The installation setup of the QD-MSG must provide a means by which to take these two measurements reliably. From the MWM measurements at two lift-offs, an angle is determined between the direction of the lift-off induced response change on the measurement grid and the direction of the "lift-off" lines in the grid near the operating point. MWM data is then rotated by this angle, using the measurement at the nominal lift-off as the point about which to rotate new data. Note that the static fixture prevents ideal performance of this calibration refinement since it requires unmounting and remounting the sensor which introduces noise into the system.

Although not required, the calibration can be improved with a dynamic calibration step. A significant noise source in the measurements and the main source of instrument drift is temperature dependence. Instrument drift is monitored through the use of an "air tip" (i.e., a QD-MSG mounted at a stable location in air, to be used as a reference). By monitoring how the measured air point fluctuates, the overall drift and temperature response of the instrument can be characterized and corrected. By removing drift and temperature effects due to the instrument beforehand, the larger temperature effect, material electrical property variation with temperature, can be properly corrected later.

The second step of processing the QD-MSG data, after each individual channel has been properly calibrated, is the hysteresis correction 85. The hysteresis correction used on the above data requires a loading ramp to obtain the hysteresis correction values which correlate permeability changes in the insensitive direction (the insensitive direction is the 90° direction, i.e., permeability measurement in the direction along the circumference of the shaft) with permeability changes in the other three directions (0°, +45°, −45°) at the same sensor location. A hysteresis correction ramp can be any ramp that starts with a no-load condition and records data at several loading conditions on the way up to a high load, and the same loading conditions on the way down.

After recording the hysteresis ramp data, an optimization method is used to determine the factors that most accurately correlate the response of the channels with the insensitive orientation to the responses of the other channels 87. It is important to note that this is an initial hysteresis correction, in that it makes the assumption that the loading conditions on the ramp down can be accurately matched to the loading conditions on the ramp up. In the simple static setup, even "pure torque" cases can have a significant amount of bending and it is very difficult to reach the same loading conditions on the way down as on the way up. Nevertheless, this initial hysteresis correction for the static tests worked reasonably well.

Using a bending ramp, as opposed to a torque ramp, lowers the resulting noise by providing a better hysteresis correction because it is easier to recreate loading conditions in a pure bending scenario than the "pure" torque case in a simple static simple fixture. This led to an improved hysteresis correction that does not require such strict control of the loading ramps. Preliminary tests of this new correction show improvements when dealing with multiple applied loads.

The third step of processing is correcting for material temperature effects. Complicating matters, the permeability of the shaft being measured is also temperature dependent 89. This can be corrected by a no-load normalization. This is a normalization of the permeability by the most recently measured (or estimated) no-load point. As the material temperature drifts, the no-load response will vary slightly; thus, updating this no-load point is one way to remove temperature effects and enhance performance over long periods of time. From the physical model, it is possible to estimate how the no-load point changes by monitoring the relative changes of the channels in different directions. Knowing that torque will cause the two ±45° channels to move in equal and opposite directions and bending will affect the ±45° channels half as much as the 0° channel, with all three moving in the same direction, the drift of the no-load point can be estimated as $$\Delta_{no\ load} = (\Delta_{(+)45} + \Delta_{(-)45}\Delta_0)/2$$

where $\Delta$ denotes the change in each orientation. A change in shaft temperature manifests itself as a change in the no-load point. By correlating the movement of the no-load point with the movement of the stress estimation of each channel, the no-load re-estimation method effectively compensates for temperature fluctuations 91.

The final (fourth) step of processing is multiplication by a permeability-to-stress factor 93. This factor is found by fitting a calibration set of data (i.e., the hysteresis ramp data after hysteresis correction similar to the data shown in FIG. 27) to the known loads, as determined by the strain gages during initial calibration of the QD-MSG, applied in order to convert from permeability response to stress. Research to date has shown this factor to be portable and time invariant. The permeability-to-stress relationship appears to be a simple linear relationship. This dramatically simplifies implementation and should enable convenient implementation of control algorithms and other uses for this non-contact torque data.

Figure 27:
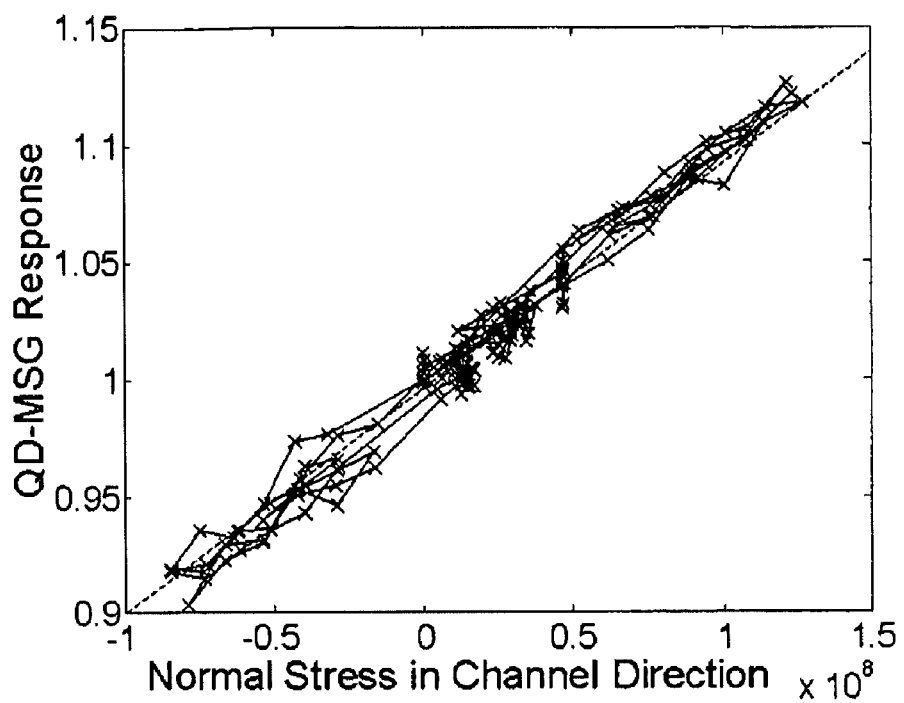
FIG. 27 shows a plot of the corrected QD-MSG response versus stress (derived from the strain gages) caused by multi-axial loading and using the static test setup.

FIG. 27 shows the successful implementation of the above method. Three of the QD-MSG channels, which are in three different orientations (axial, i.e. 0°, 45°, and −45°) are plotted against the stresses, derived from the strain gages using a solid-mechanics model, acting in the direction in which the channel measures permeability. For an MWM sensor, and for each QD-MSG channel, this direction is perpendicular to the longer drive winding segments. The same results were obtained from multiple tests. Data taken on different days share the same hysteresis correction factors and the same initial calibration. A no-load recalibration is then performed, without modification to the hysteresis correction factors. The responses are shown for varying applied stresses (as measured by the strain gages). The fourth channel at the 90° orientation was used for hysteresis correction, as described earlier. The stresses are applied by a combination of torsion and bending in the simple static test setup. Many different combinations of torsion and bending loads were applied to create a variety of multi-directional stress states. A portion of the data from the first test was used as a calibration set to develop the hysteresis correction factors. The linear correlation was obtained for both bi-directional and uni-directional loading schemes.

Figure 28:
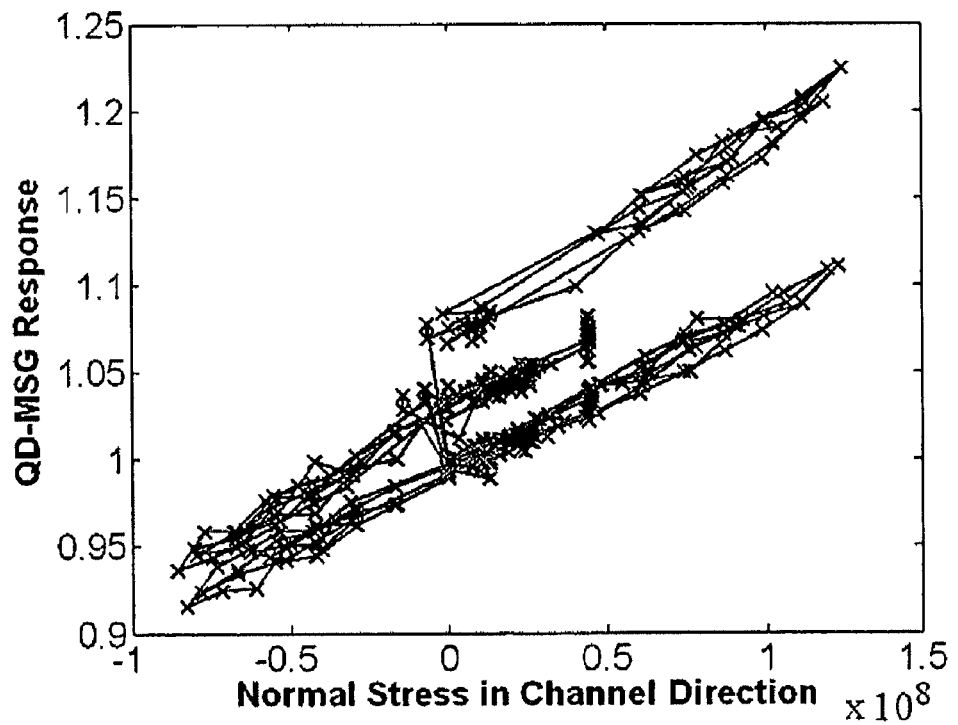
FIG. 28 shows a plot of the temperature dependent QD-MSG response versus stress caused by multi-axial loading and using the static test setup.

The successful implementation of the temperature correction was also examined in the simple static test setup. FIG. 28 shows the QD-MSG response before the no-load estimation temperature correction. This shows that a 20 degree temperature shift can have a significant effect on the measurement response. However, after the temperature correction the results are equivalent to FIG. 27.

The algorithm and procedures developed using the simple static test setup was then applied to two full-scale dynamic tests. The configuration selected for these dynamic tests used nine QD-MSGs equally spaced around the circumference of the helicopter rotor shaft. Three sensor strips, each with three QD-MSGs and each covering ⅓ of the full circumference of the shaft, were installed. In each of the QD-MSGs, the magnetic permeability, and thus the stress, were measured in four directions: 0°, 90°, 45°, and −45°. The stresses at all nine locations (three sensor strips with three QD-MSGs each) were used to determine the torque, bending, and axial loads. Also, each sensor provides an independent lift-off (proximity) measurement. This proximity measurement can be used to refine load estimates (i.e., to identify bending load direction) or to provide an independent measure of radial vibrations.

The test facility had the capability to apply torque, bending, axial, and drag loads. The torque was applied by means of a closed-loop mechanical feedback system. The bending, axial, and drag loads were applied by hydraulic actuators. The magnitudes of the applied forces were monitored via load cells attached to the hydraulic actuators. The goal of these tests was both to enable the demonstration of non-contact torque sensing in a realistic environment.

Figure 29:
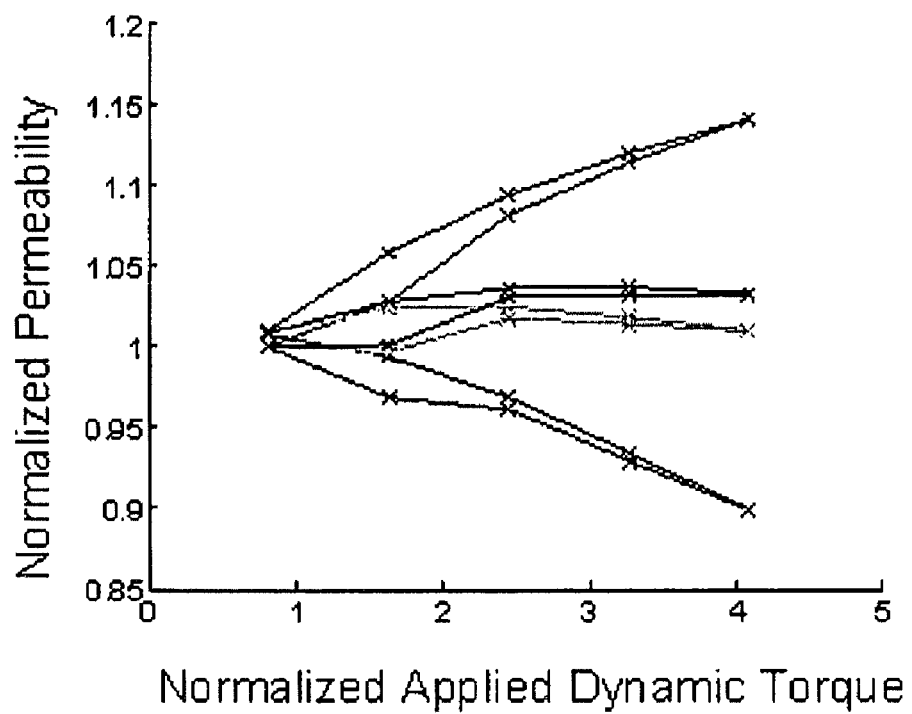
FIG. 29 shows the permeability response in the four directions of a QD-MSG before hysteresis correction, but after temperature correction.
Figure 30:
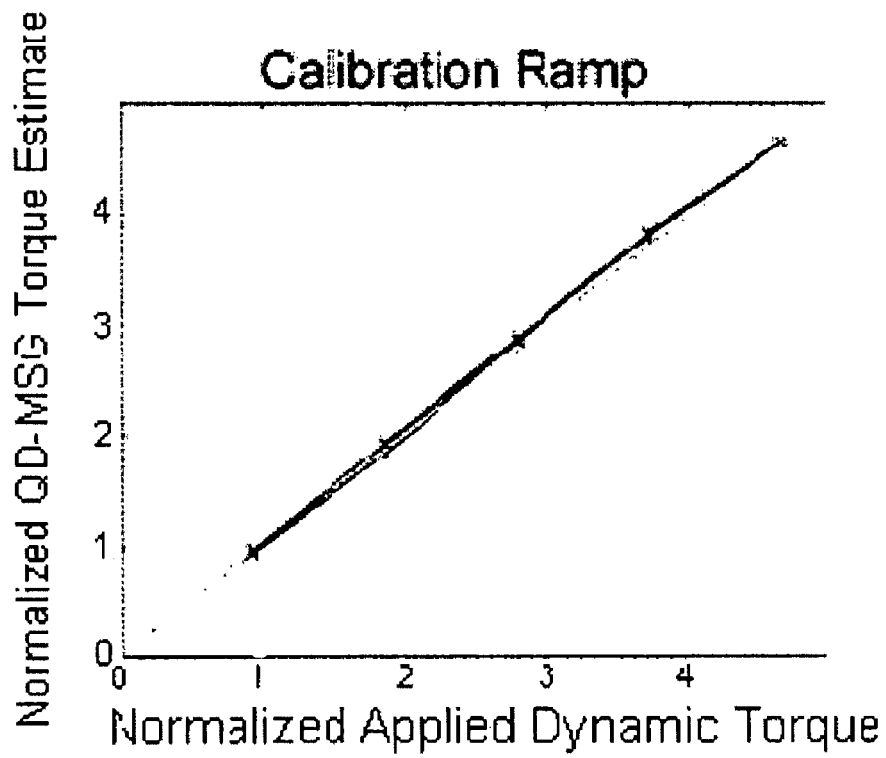
FIG. 30 shows a plot of the QD-MSG measured torque versus applied torque, after temperature and hysteresis corrections, for the calibration ramp.

In the first dynamic test, the ability to estimate torque in the pure torque case was assessed, as well as the robustness of the calibration and hysteresis correction methods. With the sensor assembly mounted onto a gearbox and the gearbox mounted into the test stand, the setup was run at full speed under a variety of loading conditions. These conditions included torques from 20% to 100% of the maximum design torque, as well as various levels of bending loads and lifting loads. FIG. 29 shows measured permeability data after temperature correction but prior to hysteresis correction for each of the four MWM channels in one of the QD-MSGs. This data is typical of a hysteresis correction ramp. FIG. 30 shows the effect of hysteresis correction on the dynamic test data. The result of the procedure developed on the simple static test stand, described above, is an essentially linear relationship between the hysteresis-corrected MWM permeability measurements and the stresses in the rotor shaft, which was derived from strain gages installed on the shaft. The dynamic test results appear far less noisy, because the loading controls on the dynamic test setup are much better than on the simple static test facility, the strain gage data is more reliable, and the lift-off can be adjusted for calibration without removal of the sensors. The same results for FIG. 30 were observed at later times and days, which demonstrated the robustness of the calibration methods. This is critical for final implementation. For example, one can load a shaft during initial installation in production. Then the hysteresis correction loading ramp and the permeability-to-stress relationship for that individual shaft would be stored and reused over the life of the rotorcraft, or at least until the next major maintenance opportunity.

Figure 31:
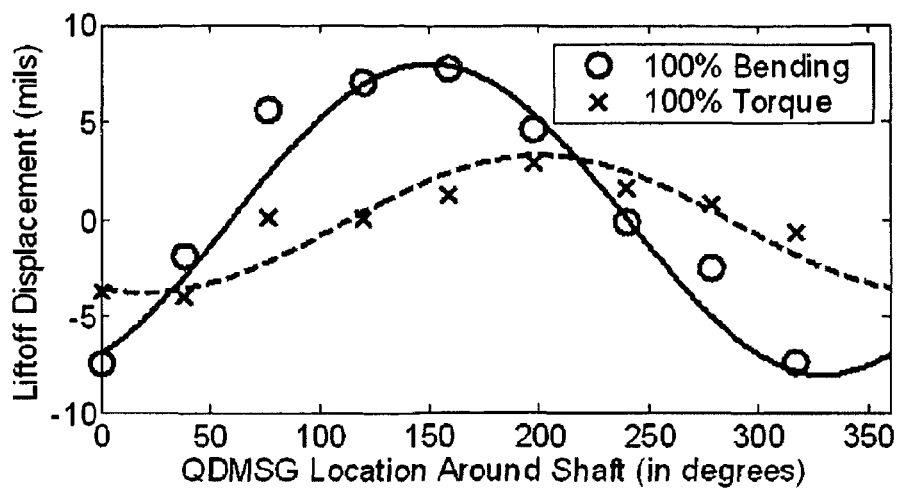
FIG. 31 shows the QD-MSG-measured lift-off (displacement from the average) as a function of circumferential angle, for intended "pure torque" and bending loads.

In a second full-scale dynamic test, the no-load normalization was implemented as part of the calibration procedure. From the bending strain gage data, it was apparent that the intended "pure torque" cases did have some bending load contamination. Applying a torque while spinning at 225 rpm resulted in an unintended bending load that was about 20% of the maximum bending load used in the pure bending tests. Independently, by observing the deflection of the shaft through changes in lift-off measurements, it became clear that the nominal bending due to torque was in a different direction than the bending load due to a hub moment. If the shaft were to deflect in a given direction, one would expect the change in lift-off to be sinusoidal with position around the shaft, with the maximum being the direction of bending. As can be seen in FIG. 31, which plots the QD-MSG-measured lift-off (displacement from the average), the peaks of the sinusoidal liftoff-displacement curve are in two different angles, depending on whether the bending is purposely applied or an artifact of the intended torque application.

This plot is significant as it highlights a drawback to the original hysteresis correction method which required a loading ramp with predetermined pure loading states. It is unreasonable to assume that pure torque can be applied, and such an assumption would result in an inaccurate hysteresis correction. Furthermore, this lift-off monitoring demonstration is the first step in developing the capability to monitor shaft vibrations.

Figure 32:
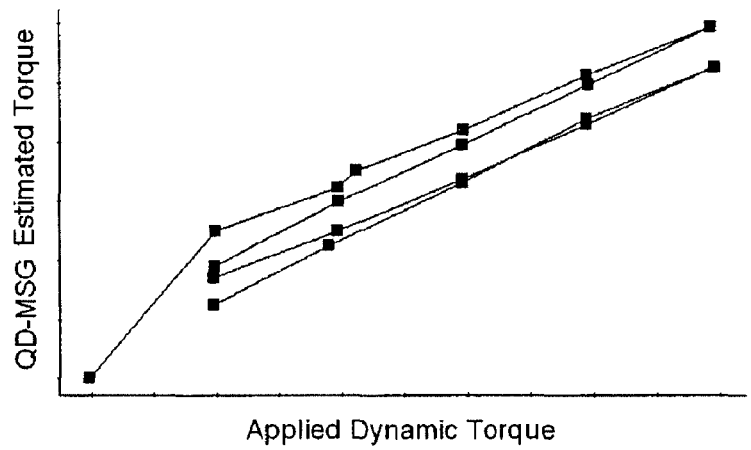
FIG. 32 shows the effect of calibration procedure on hysteresis correction where an initial calibration procedure was used.
Figure 33:
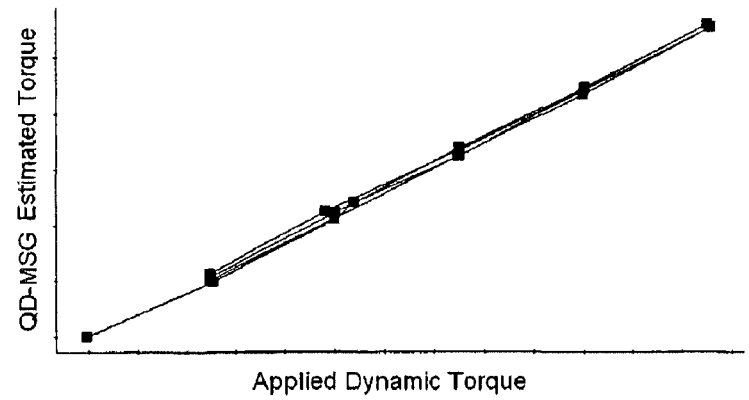
FIG. 33 shows the effect of calibration procedure on hysteresis correction using a calibration procedure refined after the second dynamic test.

Using this data as a reference, the hysteresis correction procedure was enhanced to work with generic, multi-axial loading. The fundamental difference between the original hysteresis correction and the new, more general hysteresis correction is the assumption that is made to calculate the factors. In the original method, pure, known loading states were assumed and a linear relationship was discovered. In the new method, a linear relationship is assumed, and strain gauge data is used to identify what the loading states are on the calibration loading ramp. This provides enough information to determine the hysteresis correction factors regardless of the complexity of the loading state. Another advantage is that this new method simultaneously calculates the permeability-stress factors. FIG. 32 and FIG. 33 show the effect of this new calibration procedure. FIG. 32 shows a sample set of data corrected for hysteresis using the old calibration procedure. FIG. 33 shows the same data as FIG. 32, but calibrated using the new multi-axial loading procedure. This procedure allows a full range of loads to be applied to the shaft during the hysteresis correction. As long as the loads are known, the hysteresis correction can be calibrated to produce a linear response. This substantially reduces the rigor required to control the loads for proper sensor calibration and hysteresis correction, making this solution more practical.

Figure 34:
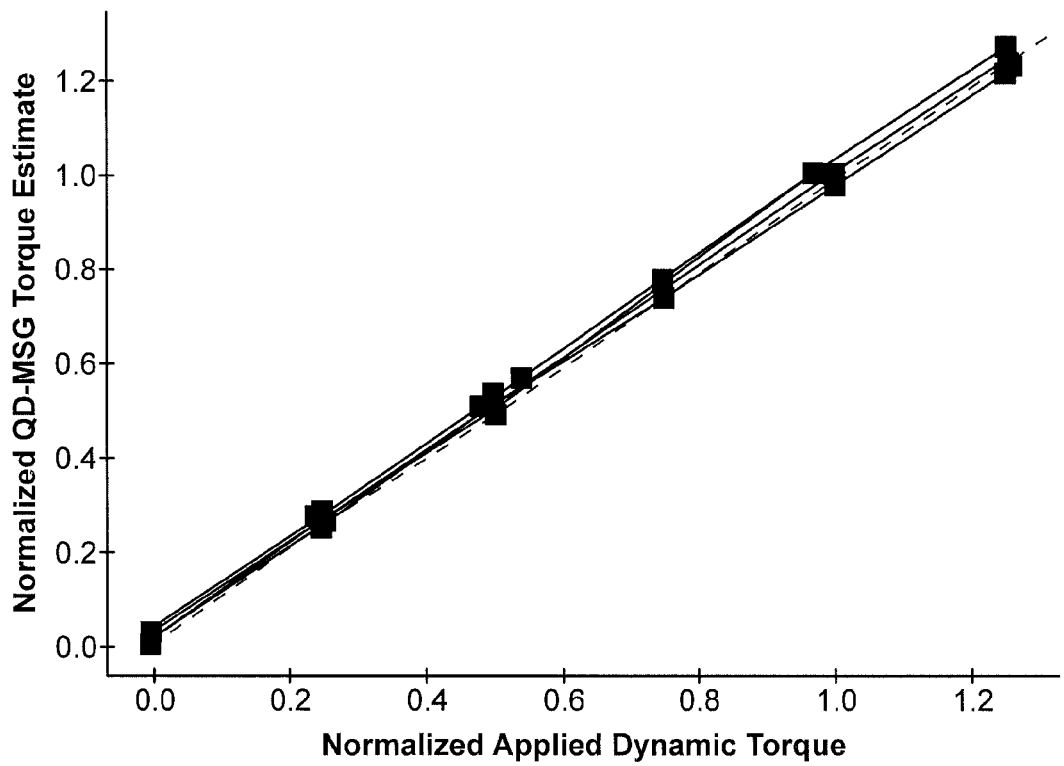
FIG. 34 shows torque estimates based on the QD-MSG's versus the torque estimated based on strain gages. Several of the data sets include bending loads.

FIG. 34 shows the final torque estimates based on the QD-MSG data versus estimated applied torque. Several of the data sets included in this plot have applied bending loads. The response is linear and the error is low.

FIG. 31 also demonstrates other measurement capabilities. Changes in the lift-off monitored over time and at multiple circumferential locations can be used to approximate bending loads. This provides a means check the magnetic property variation estimate of the bending load for errors. Furthermore, this information can be used to determine the direction of bending and provides perspective on the current dynamic mode for the operation of the shaft.

The above algorithm for calculating shaft loads giving multi-directional permeability measurements makes one assumption; the stress in the no-load direction is effectively zero. This, however, is only accurate if the hoop stress due to the rotation of the shaft is small. Given a large hoop-stress, another correction would be needed. With an estimation of the shaft rotation rate (e.g., from an encoder or shaft material variations) and knowledge of the shaft geometry and material properties, the hoop stress can be calculated and corrected for.

Another application is dynamic stress assessment of a rotating component containing discrete feature, such as individual posts or planets is described in while U.S. patent application Ser. No. 11/702,422 titled "Quasistatic Magnetic and Electric Field Stress/Strain Gages," filed Feb. 5, 2007, the entire teachings of which are incorporated herein by reference. Here, the approach is extended by providing for the use of noncontact measurements that can be used to assess the torque on the rotating component. Furthermore, the stress or torque of the individual features is used to obtain the net torque on the system, such as on the rotor shaft. The information from the measurements on each post can be used as part of a condition based maintenance program for the component. Note that this approach can also be used to measure features of objects moving relative to the stationary member. Examples include the weight of trucks on a bridge and the effect of wind on a bridge or similar structure.

Figure 35:
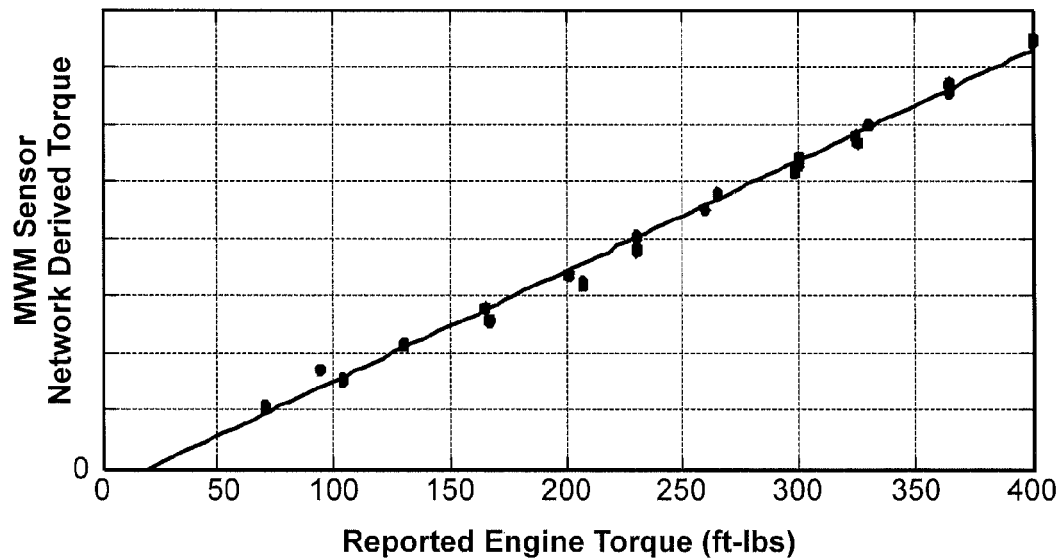
FIG. 35 shows the correlation of the MWM sensor network torque estimate with reported mean engine torque.

For example, four MWM sensors (or magnetic stress gages) were mounted around the outer, accessible circumference of a ring gear. The protective coating on the outside of the ring gear was left intact and not removed for the sensor installation. The magnetic permeability at each of these locations was then estimated using a multivariate inverse method. The permeability versus stress relationship for this material was then determined. During operation, the local stress estimates from each sensor were converted into estimate of the stress on the individual carrier plate posts using a using a systems identification approach. The individual post stresses were then combined into a torque estimate for the main rotor shaft as shown in FIG. 35. Variations in these signals then allow the remaining life for individual carrier plates to be determined, to determine if geometric anomalies or other factors are causing overloading or higher loads than anticipated, and as input for remaining life estimation of other dynamic components.

Figure 36:
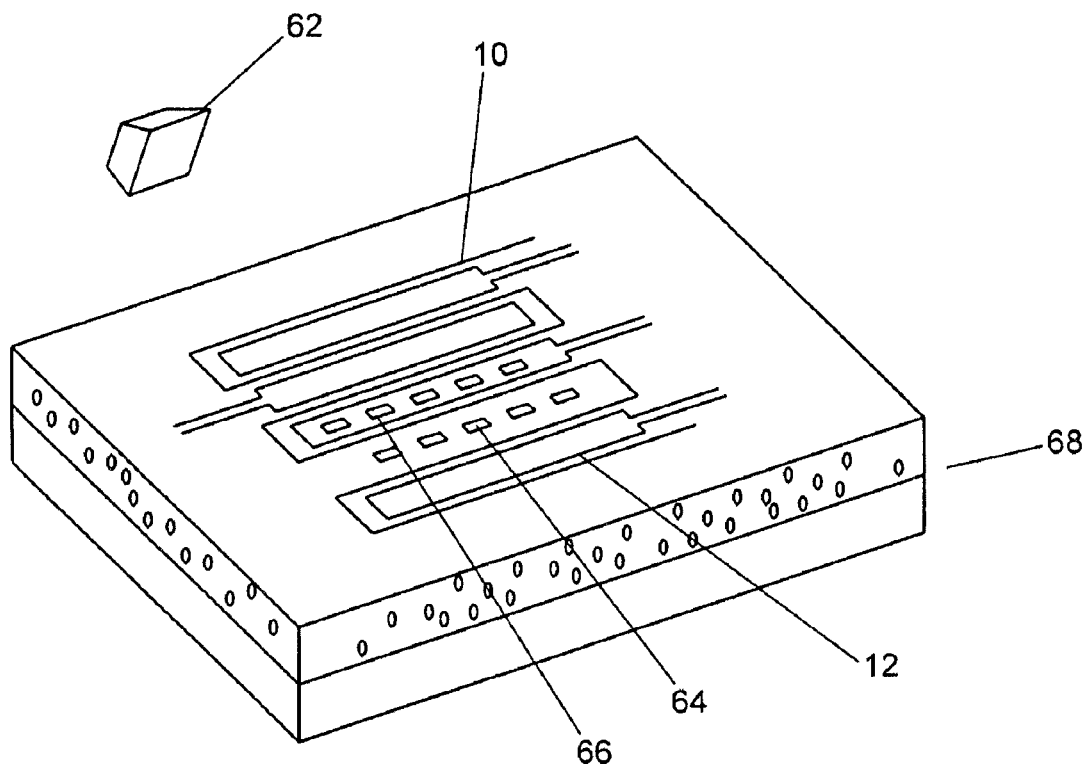
FIG. 36 shows a schematic diagram for a composite structure with a magnetic field sensor placed over the material surface.

Note also that these sensors and measurement methods can be applied to other material systems, such as composite structures. As an example, consider FIG. 36, where a sensor having a a drive winding 10 is placed over a composite test material 68. The sense elements 64 provide a response that can be related to the composite material condition depending upon the applied loads, such as mechanical or thermal applied loads. For example, the temperature of the test material can also be varied with ambient conditions or sources 62 such as heat lamps or lasers typical of other thermal nondestructive inspection methods as described in U.S. patent application Ser. No. 11/036,780, filed Jan. 14, 2005, the entire teachings of which are incorporated herein by reference. Using one or more thermal sense elements 66 (or strain gages for mechanical loading) placed in the vicinity of the drive winding sense the temperature of the test material. These thermal sense elements can be thermistors, thermocouples, or other temperature sensitive devices. The drive windings can be oriented in specific directions with respect to the fibers of the composite to enhance sensitivity to the condition of interest, such as the temperature or stress. When sensors with multiple drive windings are selected, the angle between the drive windings, or the angle between the magnetic field directions associated with each drive winding orientation, can be selected to match the fiber orientation in the difference plies or laminates of the composite structure. For such heterogeneous materials, it is often convenient to express the effective or composite properties in terms of a complex diamagnetic permeability, as described for example in U.S. Pat. No. 5,453,689.

Figure 37:
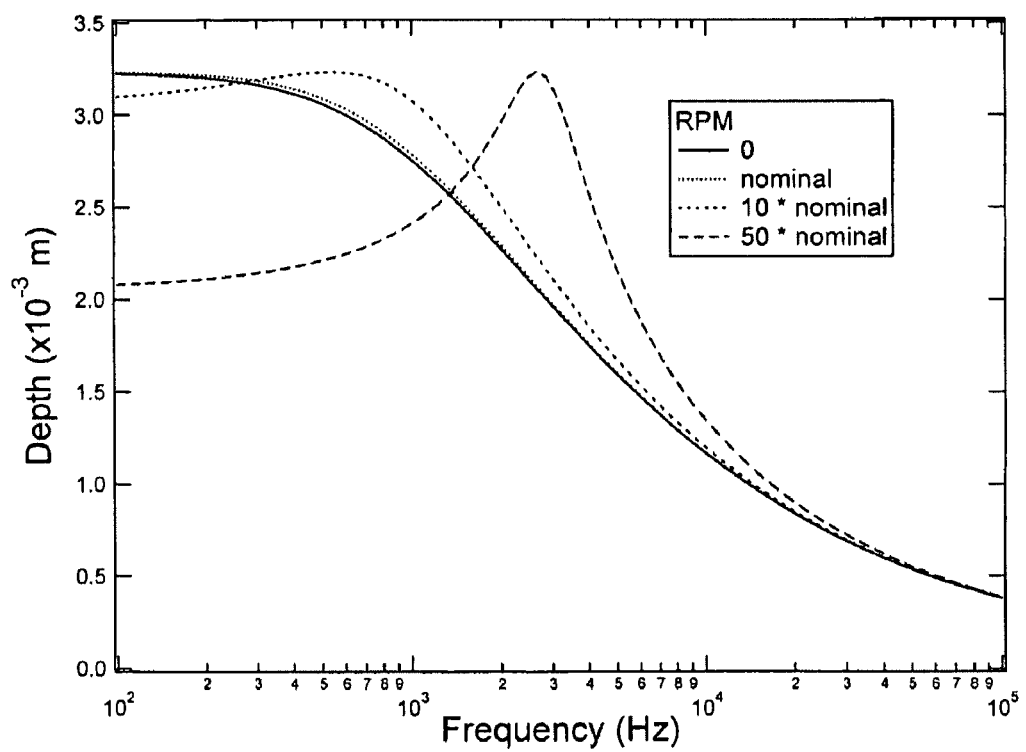
FIG. 37 shows a plot of the depth of penetration of a spatially periodic magnetic field into a test material as the convection velocity or rotation rate is varied.

In many situations, the sensor or sensor array will be in motion relative to the test material. This can occur, for example, when scanning across the surface of a material for a flaw. Most often the time interval determined by the scanning speed and the characteristic length scale of the sensor is much greater than the time period of the imposed AC field, in which case the effects of the motion are negligible. As described for example in U.S. Pat. No. 6,992,482, in some situations the relative motion of the sensor and the material under test can influence the magnetic field distribution and the sensor response. For example, for a spatially periodic winding distribution and material motion in the same direction, then the magnetic vector decays exponentially with distance into a uniform material with a decay rate $$\gamma = \sqrt{k^2 + j\sigma\mu(\omega31ku)}$$

where $k=2\pi/\lambda$ is the wavenumber, $\sigma$ is the electrical conductivity, $\mu$ is the permeability, $\omega=2\pi f$ is the angular frequency of the excitation, and $\mu$ is the material velocity. The velocity has the effect of changing the effective frequency of the excitation and hence the decay rate of the magnetic field into the material under test. This effect can be modeled and FIG. 37 shows how the depth of penetration of the magnetic field (expressed as $1/Re(\gamma)$ varies with the excitation frequency of the drive current and the rotation rate of a cylindrical shaft. In this case, assumed nominal values were a spatial wavelength of 0.02 m, relative permeability of 15, conductivity of 2% IACS, outside diameter of 0.092 m, and rotation rate of 225 rpm. For low rotation rates, the depth of penetration is not affected by the movement of the test material. However, at relatively high rotation rates and relatively low excitation frequencies, there can be a significant effect of the material motion on the depth of penetration of the magnetic field and on the resulting sensor response.

While the inventions have been particularly shown and described with reference to preferred embodiments thereof, it will be understood to those skilled in the art that various changes in form and details may be made therein without departing from the spirit and scope of the invention as defined by the appended claims.

What is claimed is:

1. A method for stress assessment comprising:
   disposing a sensor proximate to a test material, the sensor having at least two drive windings and at least two sense elements, the drive windings connected in series for exciting a spatially periodic magnetic field of at least two periods when driven by an electric current, with the drive windings oriented in at least two different directions, positioned in at least two separate planes, and covering an overlapping area of the test material, the sense elements sensing a response to the test material, with each sense element positioned to measure a test material response primarily associated with one of the drive windings and not with the other drive windings;
   converting the response of each sense element into a property estimate for the test material in at least two directions, the property estimate exhibiting hysteresis as an applied load varies the stress of the test material; and
   correlating a property estimate to the stress of the test material in a first direction, with a property estimate in at least one second direction used to remove hysteresis effects on the property estimate in the first direction, the hysteresis effect determined by loading the test material to a known level and computing at least one correction factor that removes the hysteresis from the first direction.

2. The method as claimed in claim 1 further comprising:
   the test material being a rotating cylinder;
   the sensor having two pairs of orthogonal drive windings and sense elements, stationary, not in contact with the test material; and
   the stress providing a measured load on the rotating cylinder.

3. The method as claimed in claim 2 wherein the measured load is the torque on the rotating cylinder.

4. The method as claimed in claim 2 wherein the measured load is an axial load on the rotating cylinder.

5. The method as claimed in claim 2 wherein the measured load is a bending load on the rotating cylinder.

6. The method as claimed in claim 1 wherein the stress in at least two directions is determined from at least three drive windings and at least three sense elements.

7. The method as claimed in claim 1 wherein the stress provides a measure of torque, bending and axial load on a spinning shaft in a drive system.

8. The method as claimed in claim 1 wherein the stress is measured in at least two directions on a ferrous metal structural member or a structural member coated with a ferrous metal, and the property is a magnetic permeability.

9. The method as claimed in claim 1 wherein sensing element measurements are made simultaneously.

* * * * *